United States Patent
Suzuki et al.

(10) Patent No.: US 6,438,315 B1
(45) Date of Patent: Aug. 20, 2002

(54) DATA INPUT METHOD, ENCODING APPARATUS, AND DATA PROCESSING APPARATUS

(75) Inventors: Kazuhiro Suzuki; Toshimasa Mizunashi; Yasuo Nomura; Yasuhiko Terashita; Takehiro Yokoyama, all of Kanagawa (JP)

(73) Assignee: Sony Corporation (JP)

(*) Notice: Subject to any disclaimer, the term of this patent is extended or adjusted under 35 U.S.C. 154(b) by 1057 days.

(21) Appl. No.: 08/852,415

(22) Filed: May 7, 1997

Related U.S. Application Data

(63) Continuation of application No. 08/512,400, filed on Aug. 8, 1995, now abandoned.

(30) Foreign Application Priority Data

Aug. 19, 1994 (JP) ............................................. 6-195195

(51) Int. Cl.[7] ................................................. H04N 5/91
(52) U.S. Cl. ......................................... 386/95; 386/125
(58) Field of Search ............................ 386/1, 4, 35, 38, 386/39, 52, 54, 96, 98, 117, 95, 125; 348/552, 705–706, 722; 360/16, 64; 395/154; 369/102; H04N 5/91

(56) References Cited

U.S. PATENT DOCUMENTS

| | | | | |
|---|---|---|---|---|
| 4,996,597 A | * | 2/1991 | Duffield | 358/181 |
| 5,027,222 A | * | 6/1991 | Shinbo et al. | 358/330 |
| 5,239,382 A | * | 8/1993 | Hatakenaka et al. | 358/335 |
| 5,274,779 A | * | 12/1993 | Stewart et al. | 395/425 |
| 5,418,713 A | * | 5/1995 | Allen | 364/403 |
| 5,428,453 A | * | 6/1995 | Ido et al. | 358/319 |
| 5,446,714 A | * | 8/1995 | Yoshio et al. | 369/48 |
| 5,461,597 A | * | 10/1995 | Amano | 369/32 |
| 5,511,054 A | * | 4/1996 | Oishi et al. | 369/59 |

* cited by examiner

*Primary Examiner*—Vincent Boccio
(74) *Attorney, Agent, or Firm*—Rader, Fishman & Grauer PLLC; Ronald P. Kananen, Esq.

(57) ABSTRACT

A data processing method for converting data to be recorded on a digital video disc into a record format thereof is disclosed, comprising the steps of generating source data including at least a picture signal, encoding the source data into encoded data, generating a script including at least information of the disc and playback control information in a tabular format, generating format information of the disc corresponding to at last the script and the encoded data, and generating record format data composed of the encoded data corresponding to the format information.

25 Claims, 35 Drawing Sheets

STILL PICTURE SOURCE

| SOURCE NAME | FILE NAME | FORMAT | RESOLUTION |
|---|---|---|---|
| SP1 | ¥MAINMENU.TIF | TIF | H |
| SP2 | ¥KARMENU.TIF | TIF | H |
| SP3 | ¥CREDIT.RGB | TIF | H |
| OHP1 | ¥OHP1.TIF | RGB | H |
| OHP2 | ¥OHP2.TIF | TIF | H |
| OHP3 | ¥OHP3.TIF | TIF | H |
| OHP4 | ¥OHP4.TIF | TIF | H |
| OHP5 | ¥OHP5.TIF | TIF | H |

Fig. 9

DISC INFORMATION

| ITEM | DESCRIPTION |
|---|---|
| ALBUM ID | COFF SAMPLE |
| NUMBER OF VOLUMES IN ALBUM | 1 |
| VOLUME NUMBER | 1 |
| VOLUME ID | COFF SAMPLE |
| VOLUME SET ID | COFF SAMPLE |
| PUBLISHER | SONY |
| DATA PROVIDER | SONY |
| TIME AND DATE OF PUBLICATION | 1994/08/04 13:32:00 |
| DISC TITLE | COFF SAMPLE |
| CATALOG NUMBER | |
| NUMBER OF PROGRAMS | 4 |
| SONY SERIAL | |

Fig. 10

KARAOKE INFORMATION

| SOURCE NAME | ISRC | TITLE | TITLE(FOR SORTING) | SINGER | SINGER(FOR SORTING) | | | | | | | |
|---|---|---|---|---|---|---|---|---|---|---|---|---|
| MV1 | JPSNY9408001 | KARAOKE PROGRAM 1 | KARAOKE 1 | SINGER 1 | SINGER 1 | | | | | | | |
| MV2 | JPSNY9408002 | KARAOKE PROGRAM 2 | KARAOKE 2 | SINGER 2 | SINGER 2 | | | | | | | |
| MV3 | JPSNY9408003 | KARAOKE PROGRAM 3 | KARAOKE 3 | SINGER 3 | SINGER 3 | | | | | | | |
| MV4 | JPSNY9408004 | SUSHI | SUSHI | | | | | | | | | |
| | | | | | | | | | | | | |

Fig. 11

KARAOKE INFORMATION

| SOURCE NAME | 8:ISRC | 9:TITLE | 10:TITLE(FOR SORTING) | 11:SINGER | 12:SINGER(FOR SORTING) |
|---|---|---|---|---|---|
| MV1 | JPSNY9408001 | KARAOKE PROGRAM 1 | KARAOKE 1 | SINGER 1 | SINGER 1 |
| MV2 | JPSNY9408002 | KARAOKE PROGRAM 2 | KARAOKE 2 | SINGER 2 | SINGER 2 |
| MV3 | JPSNY9408003 | KARAOKE PROGRAM 3 | KARAOKE 3 | SINGER 3 | SINGER 3 |
| MV4 | JPSNY9408004 | SUSHI | SUSHI | | |

Fig. 13

MOVING PICTURE SOURCE

| SOURCE NAME | START | END | LOCATION | AUDIO RATE | AUDIO MODE |
|---|---|---|---|---|---|
| MV1 | 01:01:00:00 | 01:04:28:00 | TRACK | 224K | STEREO |
| MV2 | 01:04:50:00 | 01:08:43:00 | TRACK | 224K | STEREO |
| MV4 | 01:40:00:00 | 01:45:00:00 | TRACK | 224K | STEREO |
| MV5 | 01:46:00:00 | 01:46:30:00 | SEGMENT | 224K | STEREO |
| MV6 | 01:46:40:00 | 01:47:10:00 | SEGMENT | 224K | STEREO |
| MV7 | 01:47:20:00 | 01:47:50:00 | SEGMENT | 224K | STEREO |

Fig. 14

STILL PICTURE SOURCE

| SOURCE NAME | FILE NAME | FORMAT | RESOLUTION | | | | |
|---|---|---|---|---|---|---|---|
| SP1 | ¥MAINMENU.TIF | TIF | H | | | | |
| SP2 | ¥KARMENU.TIF | TIF | H | | | | |
| SP3 | ¥CREDIT.RGB | RGB | H | | | | |
| OHP1 | ¥OHP1.TIF | TIF | H | | | | |
| OHP2 | ¥OHP2.TIF | TIF | H | | | | |
| OHP3 | ¥OHP3.TIF | TIF | H | | | | |
| OHP4 | ¥OHP4.TIF | TIF | H | | | | |
| OHP5 | ¥OHP5.TIF | | | | | | |

*Fig. 15*

| AUDIO SOURCE | | | | |
|---|---|---|---|---|
| SOURCE NAME | START | END | AUDIO RATE | AUDIO MODE |
| AU1 | 01:01:00:00 | 01:01:30:00 | 192K | STEREO |
| AU2 | 01:02:00:00 | 01:02:50:00 | 384K | STEREO |

Fig. 16

SLIDE SHOW

| SLIDE SOURCE NAME | SOURCE NAME | TIME CODE ABS |
|---|---|---|
| SLIDE 1 | AU2 | 00:00:00:00 |
|  | OHP1 | 00:00:00:00 |
|  | OHP2 | 00:00:10:00 |
|  | OHP3 | 00:00:20:00 |
|  | OHP4 | 00:00:30:00 |
|  | OHP5 | 00:00:40:00 |

Fig. 17

| ENCODED SOURCE | | | |
|---|---|---|---|
| SOURCE NAME | FILE NAME | TYPE | LOCATION |
| MV3 | ¥KAR3.MPG | MOVIE | TRACK |

Fig. 18

| ENTRY SOURCE NAME | ENTRY OF PROGRAM 1 | ENTRY OF PROGRAM 2 | ENTRY OF PROGRAM 3 | ENTRY OF PROGRAM 4 | ENTRY OF PROGRAM 5 | ENTRY OF PROGRAM 6 | ENTRY OF PROGRAM 7 |
|---|---|---|---|---|---|---|---|
| MV4 | 01:41:30:00 | 01:43:00:00 | | | | | |

Fig. 19

| SOURCE NAME | RELATIVE/ABSOLUTE | TIME CODE | TIME CODE | TIME CODE | TIME CODE | TIME CODE |
|---|---|---|---|---|---|---|
| | | 00:00:10:00 | 00:00:20:00 | 00:00:30:00 | 00:00:40:00 | ABS |
| SLIDE 1 | ABS | | | | | |

AUTO PAUSE

Fig. 20B

| AUTO PAUSE TIME (MM:SS) | NAME OF SOURCE TO BE PLAYED BACK | NAME OF SOURCE TO BE PLAYED BACK | NAME OF SOURCE TO BE PLAYED BACK | NAME OF SOURCE TO BE PLAYED BACK |
|---|---|---|---|---|
| | MV1 | | | |
| | MV2 | | | |
| | MV3 | | | |
| 00:05 | SLIDE1 | | | |
| | MV5 | | | |
| | MV6 | | | |
| | MV7 | | | |
| | SP3 | AU1 | | |

Fig. 21A

| Fig.21 | | | | | |
|---|---|---|---|---|---|
| | | | | Fig.21A | Fig.21B |

MENU

| LIST NAME (DESTINATION TO BE JUMPED) | NAME OF SOURCE TO BE PLAYED BACK | DESTINATION TO BE JUMPED WHEN "NEXT" IS PRESSED | DESTINATION TO BE JUMPED WHEN "PREVIOUS" IS PRESSED | DESTINATION TO BE JUMPED WHEN "RETURN" IS PRESSED | DESTINATION TO BE JUMPED WHEN "SELECT" IS PRESSED | DESTINATION TO BE JUMP UPON OCCURRENCE OF TIME OUT |
|---|---|---|---|---|---|---|
| SL1 | SP1 | | | | | |
| SL2 | SP2 | | | | | |
| M | | | | | | |
| M | | | | | | |
| M | | | | | | |
| M | | | | | | |
| M | | | | | | |
| M | | | | | | |
| M | | | | | | |
| M | | | | | | |
| M | | | | | | |
| M | | | | | | |
| M | | | | | | |
| M | | | | | | |

Fig. 21B

| PERIOD OF TIME OUT (MM:SS) | NUMBER OF REPETITIONS | VALIDITY OF IMMEDIATE JUMPING | DESTINATION TO BE JUMPED WHEN "1" IS PRESSED | DESTINATION TO BE JUMPED WHEN "2" IS PRESSED | DESTINATION TO BE JUMPED WHEN "3" IS PRESSED | DESTINATION TO BE JUMPED WHEN "4" IS PRESSED |
|---|---|---|---|---|---|---|
| | | | SL2 | PL4 | SL4 | PL8 |
| | | | PL1 | PL2 | PL3 | SL3 |

RANDOM JUMP

| LIST NAME (DESTINATION TO BE JUMPED) | NAME OF SOURCE TO BE PLAYED BACK | DESTINATION TO BE JUMPED WHEN "NEXT" IS PRESSED | DESTINATION TO BE JUMPED WHEN "PREVIOUS" IS PRESSED | DESTINATION TO BE JUMPED WHEN "RETURN" IS PRESSED | DESTINATION TO BE JUMPED WHEN "SELECT" IS PRESSED | DESTINATION TO BE JUMPED UPON OCCURENCE OF TIME OUT |
|---|---|---|---|---|---|---|
| SL3 | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |
| R | | | | | | RANDOM |

MULTI-DEFAULT [NUMERIC KEYS VALID]

| LIST NAME (DESTINATION TO BE JUMPED) | NAME OF SOURCE TO BE PLAYED BACK | DESTINATION TO BE JUMPED WHEN "NEXT" IS PRESSED | DESTINATION TO BE JUMPED WHEN "PREVIOUS" IS PRESSED | DESTINATION TO BE JUMPED WHEN "RETURN" IS PRESSED | DESTINATION TO BE JUMPED WHEN "SELECT" IS PRESSED | DESTINATION TO BE JUMPED UPON OCCURRENCE OF TIME OUT | PERIOD OF TIME OUT (MM:SS) |
|---|---|---|---|---|---|---|---|
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |
| D | | | | | MALTI 1 | | |

Fig. 23B

| NUMBER OF REPETITIONS | VALIDITY OF IMMEDIATE JUMPING | DESTINATION TO BE JUMPED WHEN "SELECT" IS PRESSED BETWEEN BEGINING OF PROGRAM AND ENTRY 1 | DESTINATION TO BE JUMPED WHEN "SELECT" IS PRESSED BETWEEN ENTRIES 1 AND 2 | DESTINATION TO BE JUMPED WHEN "SELECT" IS PRESSED BETWEEN ENTRIES 2 AND 3 | DESTINATION TO BE JUMPED WHEN "SELECT" IS PRESSED BETWEEN ENTRIES 3 AND 4 | DESTINATION TO BE JUMPED WHEN "SELECT" IS PRESSED BETWEEN ENTRIES 4 AND 5 |
|---|---|---|---|---|---|---|
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |
| 1 | 1 | | | | | |

MULTI-DEFAULT [NUMERIC KEYS INVALID]

| LIST NAME (DESTINATION TO BE JUMPED) | NAME OF SOURCE TO BE PLAYED BACK | DESTINATION TO BE JUMPED WHEN "NEXT" IS PRESSED | DESTINATION TO BE JUMPED WHEN "PREVIOUS" IS PRESSED | DESTINATION TO BE JUMPED WHEN "RETURN" IS PRESSED | DESTINATION TO BE JUMPED WHEN "SELECT" IS PRESSED | DESTINATION TO BE JUMPED UPON OCCURENCE OF TIME OUT |
|---|---|---|---|---|---|---|
| SL4 | MV4 | | | | MULTI2 | |
| SL5 | MV4:1 | | | | MULTI2 | |
| SL6 | MV4:2 | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |
| D | | | | | MULTI2 | |

Fig. 24B

| PERIOD OF TIME OUT (MM:SS) | NUMBER OF REPETITIONS | VALIDITY OF IMMEDIATE JUMPING | DESTINATION TO BE JUMPED WHEN "SELECT" IS PRESSED BETWEEN BEGINING OF PROGRAM AND ENTRY 1 | DESTINATION TO BE JUMPED WHEN "SELECT" IS PRESSED BETWEEN ENTRIES 1 AND 2 | DESTINATION TO BE JUMPED WHEN "SELECT" IS PRESSED BETWEEN ENTRIES 2 AND 3 |
|---|---|---|---|---|---|
| | 1 | 1 | PL5 | PL6 | PL7 |
| | 1 | 1 | PL5 | PL6 | PL7 |
| | 1 | 1 | PL5 | PL6 | PL7 |
| | 1 | 1 | | | |
| | 1 | 1 | | | |
| | 1 | 1 | | | |
| | 1 | 1 | | | |
| | 1 | 1 | | | |
| | 1 | 1 | | | |
| | 1 | 1 | | | |
| | 1 | 1 | | | |
| | 1 | 1 | | | |
| | 1 | 1 | | | |

MPEG DECODER PORTION 2

DATA INPUT METHOD, ENCODING APPARATUS, AND DATA PROCESSING APPARATUS

This application is a continuation of application Ser. No. 08/512,400 filed Aug. 8, 1995 now ABN.

BACKGROUND OF THE INVENTION

1. Field of the Invention

The present invention relates to a data input method, an encoding apparatus, and a data processing apparatus suitable to an authoring system for a video compact disc (hereinafter referred to as a CD).

2. Description of the Related Art

In recent years, video CDs that record digital moving pictures and audio have been commercially used. On the video CDs, pictures and audio are encoded corresponding to the MPEG (Moving Picture Expert Group) method and recorded.

To author a video CD, it is necessary to designate the mode of the MPEG method for pictures and audio, the sequence of the encoded pictures and audio on the video CD, and when necessary the playback sequence of the recorded pictures and audio on the video CD.

However, conventionally such information should be manually input by the operator through, for example, a keyboard. Thus, it is difficult to author the video CDs.

In addition, since a file naming method has been defined for the video CDs, when the location of a file is changed, if the locations of other files are changed, these files should be renamed. It is troublesome to rename such files through the keyboard.

OBJECT AND SUMMARY OF THE INVENTION

The present invention is made from the above-described point of view. An object of the present invention is to easily and simply author video CDs.

A first aspect of the present invention is a data input method comprising the steps of encoding source data composed of pictures and audio corresponding to process information that defines a process and inputting data to a data processing apparatus for converting the encoded data and information of at least a digital video disc into a record format of the digital video disc corresponding to the process information, the process information and the digital video disc information being input in a tabular format.

In the data input method, information of a playback method of the digital video disc is input in a tabular format to the data processing apparatus so as to convert the information of the playback method as well as the encoded data and the information of digital video disc into the record format.

A second aspect of the present invention is an encoding apparatus for encoding source data composed of pictures and audio corresponding to the MPEG (Moving Picture Expert Group) method, comprising an encoding means for encoding the source data corresponding to the MPEG method (for example, the encoding means is an MPEG1 video encoder 11, an MPEG1 audio encoder 12 shown in FIG. 26, or the like) and a controlling means for controlling the encoding means corresponding to process information that defines a process (for example, the controlling means is an MPEG1 encoder controlling portion 13 shown in FIG. 26 or the like). The process information in a tabular format is input to the controlling means.

A third aspect of the present invention is a data processing apparatus comprising a converting means for converting source data composed of pictures and audio and information of at least a digital video disc into a record format of the digital video disc corresponding to process information that defines a process (for example, the converting means is a video CD formatter portion 3, a CD-ROM formatter portion 5 shown in FIG. 8 or the like). The process information and the digital video disc information are defined in a tabular format.

The data processing apparatus further comprises an encoding means for encoding the source data corresponding to the process information and supplying the encoded data to the converting means (for example, the encoding means is an MPEG encoder portion 1 shown in FIG. 8 or the like).

The data processing apparatus further comprises a decoding means for decoding the encoded data that is output from the encoding means (for example, the decoding means is an MPEG decoder portion 2 shown in FIG. 8 or the like). The data processing apparatus further comprises a simulation means for simulating a playback of the digital video disc with data that is output from the converting means (for example, the simulation means is a simulation portion 4 shown in FIG. 8 or the like). When the information of the playback method of the digital video disc in the tabular method is input to the converting means, the converting means is adapted for converting the information of the playback method as well as the encoded data and the digital video disc information into the record format. In the information of playback method, the source data played back from the digital video disc can be defined with a source name. Moreover, in the process information, source data to be processed can be defined with a source name.

According to the data input method of the first aspect of the present invention, the source data composed of pictures and audio is encoded corresponding to the process information that defines a process to be performed. The encoded data and the information of at least a digital video disc in the tabular format are input to the data processing apparatus for converting them into the record format of the digital video disc. Thus, the process information and the information of the digital video disc can be easily generated. Consequently, input errors can be prevented.

According to the encoding apparatus of the second aspect of the present invention, the MPEG1 video encoder 11 and the MPEG1 audio encoder 12 are adapted for encoding the source data corresponding to the MPEG method. The MPEG1 video encoder 11 and the MPEG1 audio encoder 12 are controlled corresponding to the process information that defines a process to be performed and that is in the tabular format. Thus, the source data can be easily encoded.

According to the data processing apparatus of the third aspect of the present invention, the source data composed of pictures and audio and the information of at least a digital video disc are converted into the record format of the digital video disc corresponding to the process information that defines a process to be performed. The process information and the information of a digital video disc are defined in the tabular format. Thus, the process information and the information of a digital video disc can be easily generated. Consequently, the digital video disc can be easily produced.

These and other objects, features and advantages of the present invention will become more apparent in light of the following detailed description of best mode embodiments thereof, as illustrated in the accompanying drawings.

BRIEF DESCRIPTION OF DRAWINGS

FIG. 9 is a table showing a definition format of DISCINFO that is included "information of disc";

FIG. 10 is a table showing a definition format of KAR that is included in "information of disc";

FIG. 11 is a table showing another definition format of the KAR that is included in "information of disc";

FIG. 13 is a table showing a definition format of MOVIE that is included in "information of source";

FIG. 14 is a table showing a definition format of STILL that is included in "information of source";

FIG. 15 is a table showing a definition format of AUDIO that is included in "information of source";

FIG. 16 is a table showing a definition format of SLIDE that is included in "information of source";

FIG. 17 is a table showing a definition format of ENCODED that is included in "information of source";

FIG. 18 is a table showing a definition format of ENTRY that is included in "information of source";

FIG. 19 is a table showing a definition format of APAUSE that is included in "information of source";

FIGS. 20A and 20B are tables showing a definition format of PLAY that is included in "information of PBC";

FIGS. 21A and 21B are tables showing a definition format of MENU that is included in "information of PBC";

FIGS. 22A and 22B are tables showing a definition format of RAND that is included in "information of PBC";

FIGS. 23A and 23B are tables showing a definition format of DEF1 that is included in "information of PBC";

FIGS. 24A and 24B are tables showing a definition format of DEF2 that is included in "information of PBC";

DETAILED DESCRIPTION OF THE PREFERRED EMBODIMENTS

Next, with reference to the accompanying drawings, a video CD authoring system according to an embodiment of the present invention will be described. Before that, a video CD will be described in brief.

Figure 1:
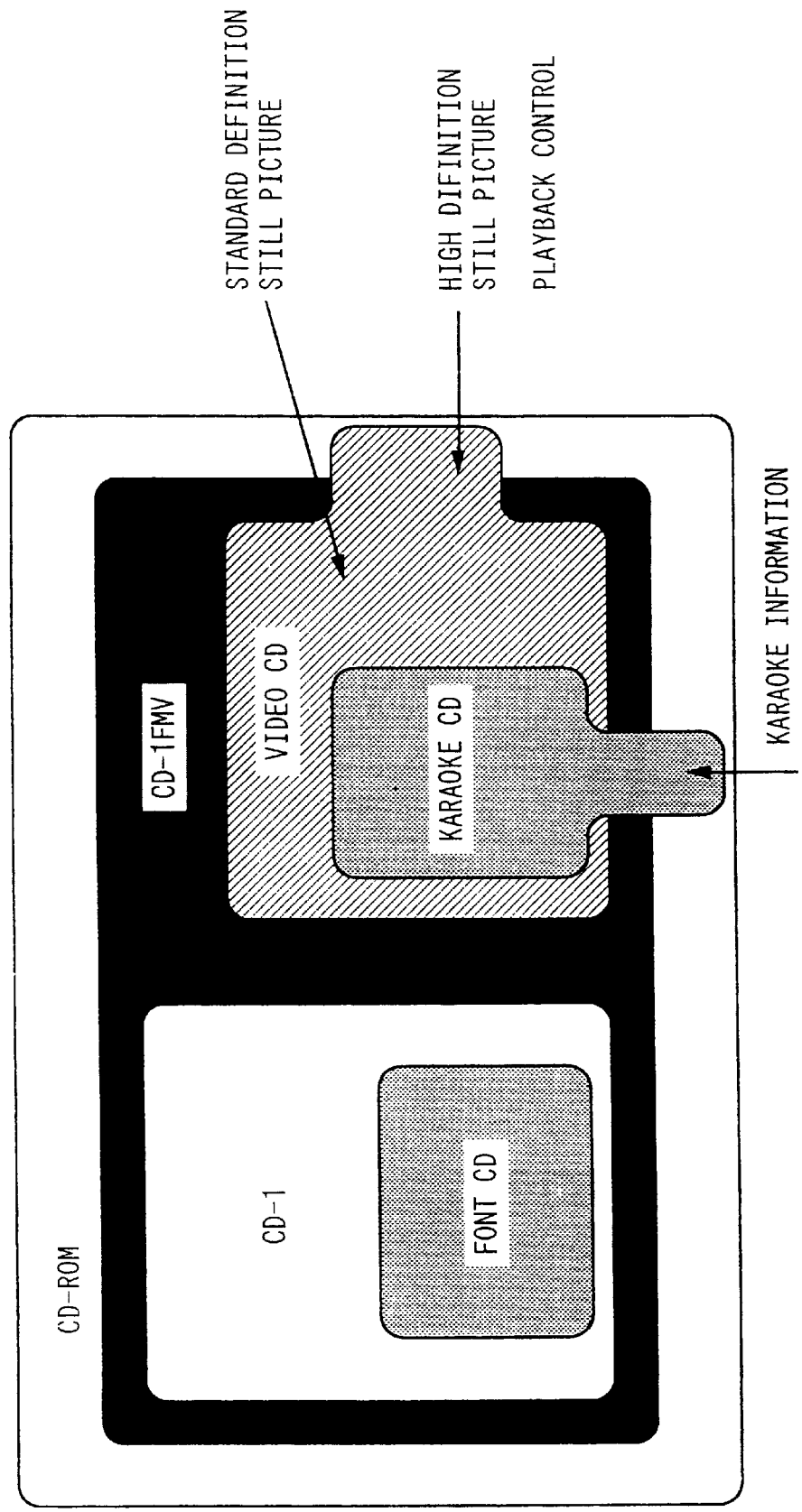
FIG. 1 is a schematic diagram showing types of CD-ROMs.

CDs have various standards corresponding to types of data recorded thereon. The CDs are roughly categorized as audio CDs (CD-DA) on which audio signals are recorded and CD-ROMs on which various types of data are recorded (as shown in FIG. 1). Video CDs on which video signals are recorded are placed under the category of the CD-ROMs shown in FIG. 1. The video CDs are used to simply play back moving pictures. In other words, the standard of the video CDs is an extended standard of so-called KARAOKE (orchestral program) CDs (the standard of CD moving picture KARAOKE).

The video CDs currently have Ver. 1.0, Ver 1.1, and Ver. 2.0. The authoring system according to the present invention is applicable for any version of the video CDs. The video CDs of version 1.0 are equivalent to KARAOKE CDs.

The video CDs are compatible with the standard of the existing CD-I FMV (Full Motion Video). Thus, the video CDs can be played back on not only a dedicated player but also a player corresponding to the CD-I FMV standard.

As with the standard of CD-I, since the standard of video CDs does do not define a specific operating system, data recorded on a video CD can be played back by a personal computer or a video game unit that is equipped with a moving picture board corresponding to the MPEG method which is a moving picture compression encoding method.

As to the structure of an video CDs, data of information portion such as computer data corresponds to so-called form 1, audio and video data to so-called form 2, and file management to ISO9660 format.

Figure 2:
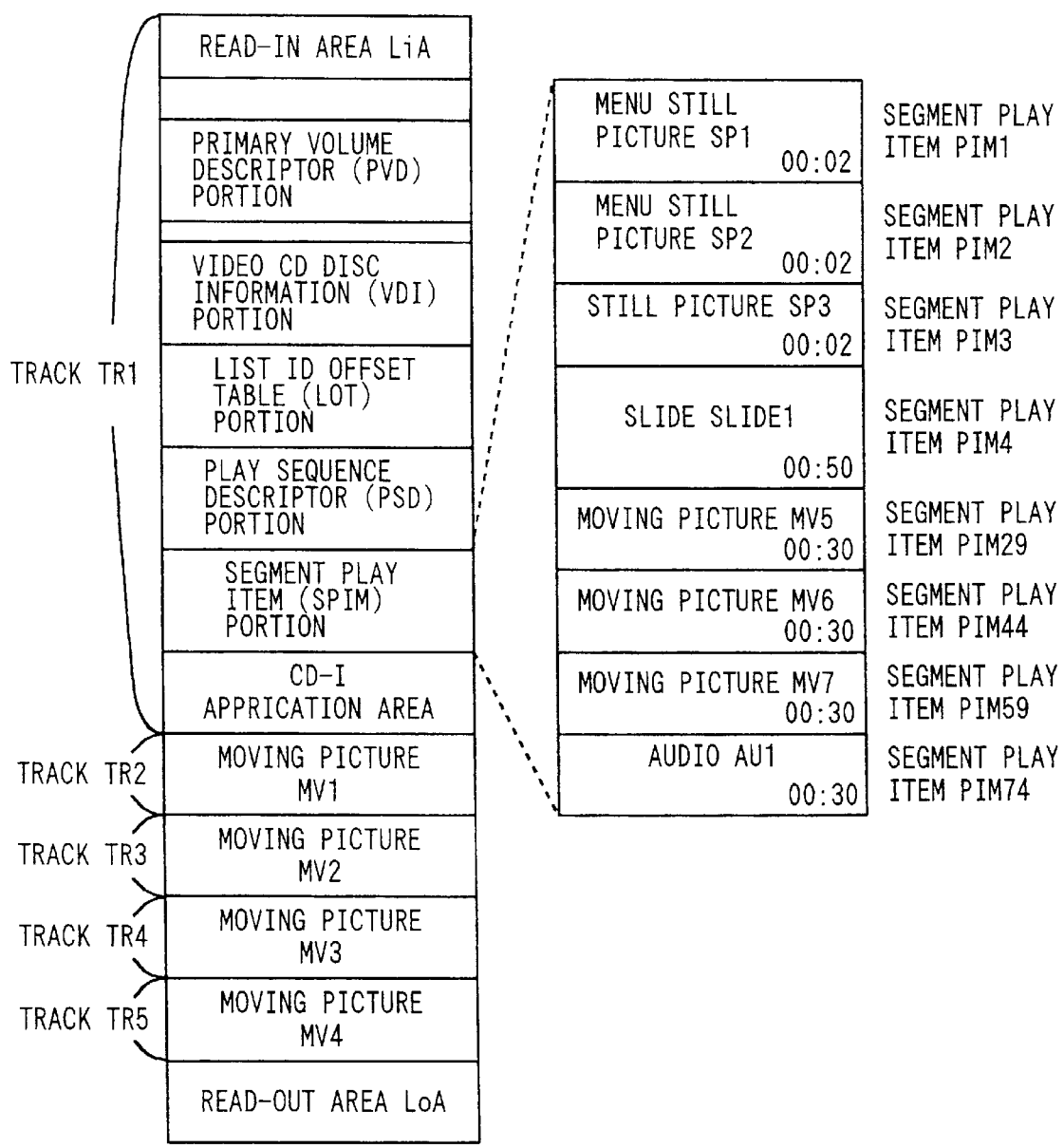
FIG. 2 is a schematic diagram showing locations of various data of a video CD.

As shown in FIG. 2, the record area of the video CD is roughly composed of a read-in area LiA (in this area, TOC (Table Of Contents) is formed), a read-out area LoA, and a data area (tracks Tr1 to Tr99). As shown in FIG. 2, corresponding to the format of the CD-ROM XA, the video CD has a video CD information VDI (Video compact Disc Information) portion on the track Tr1. In the VDI, various disc information is recorded.

In addition, on the track Tr1, a primary volume descriptor (PVD) portion, a list ID offset table (LOP) portion, a play sequence descriptor (PSD) portion, a segment play item (SPIM) portion, and an CD-I application area are placed.

The PDV portion is composed in the same manner as a bridge format between the CD-ROM XA and the CD-I (CD bridge). In the LOT portion, offset addresses of lists recorded in the PSD portion (the lists are a play list PL, a selection list SL, and an end list EL) measured from the beginning of the PSD portion are recorded. In the PSD portion, a playback procedure (information of a playback method of the video CD) is recorded in a list format. Hereinafter, the playback procedure is referred to as PBC (PlayBack Control). The list is categorized as a play list, a selection list, and an end list.

In the SPIM portion, still picture data used for menu screens or the like and when necessary moving picture data and audio data are recorded as segment play items (PIM). The PIMs are video data and audio data that have been compressed and encoded corresponding to the MPEG method (conventional MPEG data). In FIG. 2, in the SPIM portion, PIM1 to PIM4 of still pictures (still picture sequence), PIM29, PIM44, and PIM59 for moving pictures, and PIM74 for audio are recorded.

In reality, the PIM1 and PIM2 are composed of menu still pictures SP1 and SP2, respectively. The PIM3 is composed of a still picture. The PIM4 is composed of a still picture sequence (slide) SLIDE1. The PIM29, 44, and 59 are composed of moving pictures MV5, 6, and 7, respectively. The PIM74 is composed of audio AU1.

The SPIM portion is divided into segments of 2 seconds. A PIM is recorded from the beginning of a segment, not the middle of a segment. In FIG. 2, a numeric character following PIM represents a segment position (segment number) measured from the beginning of the SPIM portion.

The LOP portion, the PSD portion, and the SPIM portion are defined in the video CD Ver. 2.0.

In the CD-I application area, a CDI-I program is recorded. When a video CD is played back with a CD-I FMV player, the CD-I program is first read. The player plays back the video CD corresponding to the CD-I program. In other words, the above-described PBC is read and the video CD is played back in an interactive manner (that will be described later).

On the track Tr2 and later, the conventional MPEG data (video data and audio data that have been compressed and encoded corresponding to the MPEG method) is recorded. On a video CD, up to track 99 can be placed. Thus, the conventional MPEG data can be maximumly recorded on 98 tracks from track Tr2 to track Tr99.

In FIG. 2, tracks Tr2 to Tr5 are placed after the track Tr1. On the respective tracks, moving pictures MV1 to MV4 are recorded. In addition, on the track Tr2 or later, CD-DA data (audio data) can be recorded (not shown in FIG. 2). However, the CD-DA data is preceded by tracks on which all video data has been recorded.

The format of video signals and audio signals recorded on the video CD accords with the MPEG method (for example, the MPEG1 method). For video signals and audio signals recorded on the track Tr2 or later, approximately 1.2 Mbps and 0.2 Mbps are allocated, respectively. Thus, on the track Tr2 or later, video signals and audio signals are placed at a ratio of approximately 6 to 1.

Figure 3:
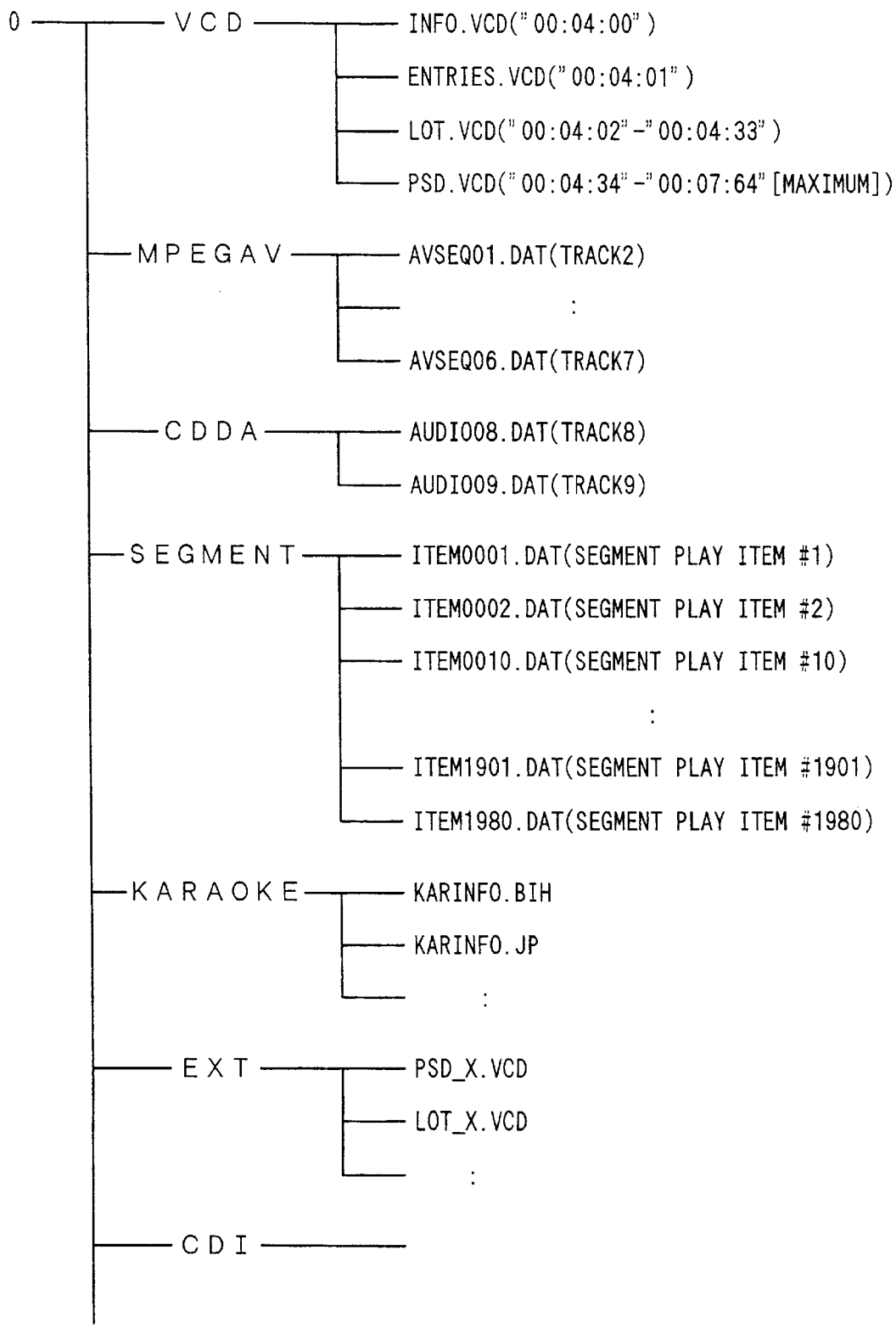
FIG. 3 is a schematic diagram showing a directory structure of a video CD.

When a video CD is played back by a unit that requires a directory management (for example a personal computer), files on the video CD are managed corresponding to a directory structure shown in FIG. 3.

In other words, under the root directory (0) of the video CD, directories such as VCD, MPEGAV, CDDA, SEGMENT, KARAOKE, EXT, and CDI are placed. As shown in FIG. 3, directory names and file names therein have been defined. The essential directories of the video CD are the root directory, CDI, VCD, and MPEGAV.

In the directory VCD, files INFO.VCD, ENTRIES.VCD, LOT.VCD, and PSD.VCD are stored. The file INFO.VCD is a file for disc information and placed in the VDI portion (see FIG. 2) of the video CD. The file ENTRIES.VCD is a file of a list of entries as start positions that have been defined to MPEG audio data and video data recorded on the video CD. The entries are more precise than indexes of CDs. As with the above-described INFO.VCD, the file ENTRIES.VCD is placed in the VDI portion (see FIG. 2) of the video CD. As the entries, up to 98 addresses of sectors can be defined for each track. In addition, the entries can be defined on the track Tr2 or later.

The files LOT.VCD and PSD.VCD are data files placed in the LOT portion and the PSD portion shown in FIG. 2, respectively.

The files INFO.VCD, ENTRIES.VCD, LOT.VCD, and PSD.VCD are placed at predetermined positions (corresponding to time codes in the format of ("xx:xx:xx") shown in FIG. 3. The files LOT.VCD and PSD.VCD are defined in the video CD Ver. 2.0. On the other hand, the files INFO.VCD and ENTRIES.VCD are defined in not only the video CD Ver. 2.0, but also the Ver. 1.1.

In the MPEGAV directory, files of MPEG audio data and MPEG video data are stored. The file names of MPEG audio data and MPEG video data should be AVSEQ#n.DAT and MUSIC#n.DATA, respectively. #n is a value that is smaller by 1 than a track number of a track at which data is recorded. Tr is followed by a track number. Note that AVSEQ#n.DAT and MUSIC#n.DAT cannot be used at the same time. In addition, AVSEQ#n.DAT is available in the video CD Ver. 1.1 and Ver. 2.0.

In the CDDA directory, files of data of the CD-DA are stored. The file names of data of the CD-DA should be AUDIO#n.DAT (where #n is a track number of a track at which data is recorded).

In the SEGMENT directory, file names of PIMs that are placed in the SPIM portion shown in FIG. 2 are stored. The file names of PIMs should be ITEM#n.DAT (where #n is a segment number of a segment at which a PIM, the beginning of the PIM, is placed. A PIM is followed by a segment number. Thus, a file name of a PIM depends on the size and stored sequence (allocation sequence).

In the KARAOKE directory, as with a KARAOKE CD, files KARINFO.BIH and KARINFO.cc are placed. On a video CD, the files KARINFO.BIH and KARINFO.cc are placed in the VDI portion (see FIG. 2). However, the files KARINFO.BIH and KARINFO.cc are placed at locations closer to the PVD portion than the VCD portion.

The extension "cc" of the file KARINFO.cc represents a country code. For Japan, "cc" is JP. For USA, "cc" is US.

The files KARINFO.BIH and KARINFO.cc are defined in the video CD Ver. 1.0, Ver. 1.1, and Ver. 2.0.

In the EXT directory, files for extension data used for a CD-I player and other computers are stored.

As with the conventional construction, in the CDI directory, files peculiar to the CD-I (for example, application programs for the CD-I) are stored. These files are placed in the CD-I application area (see FIG. 2) of the video CD.

Figure 4:
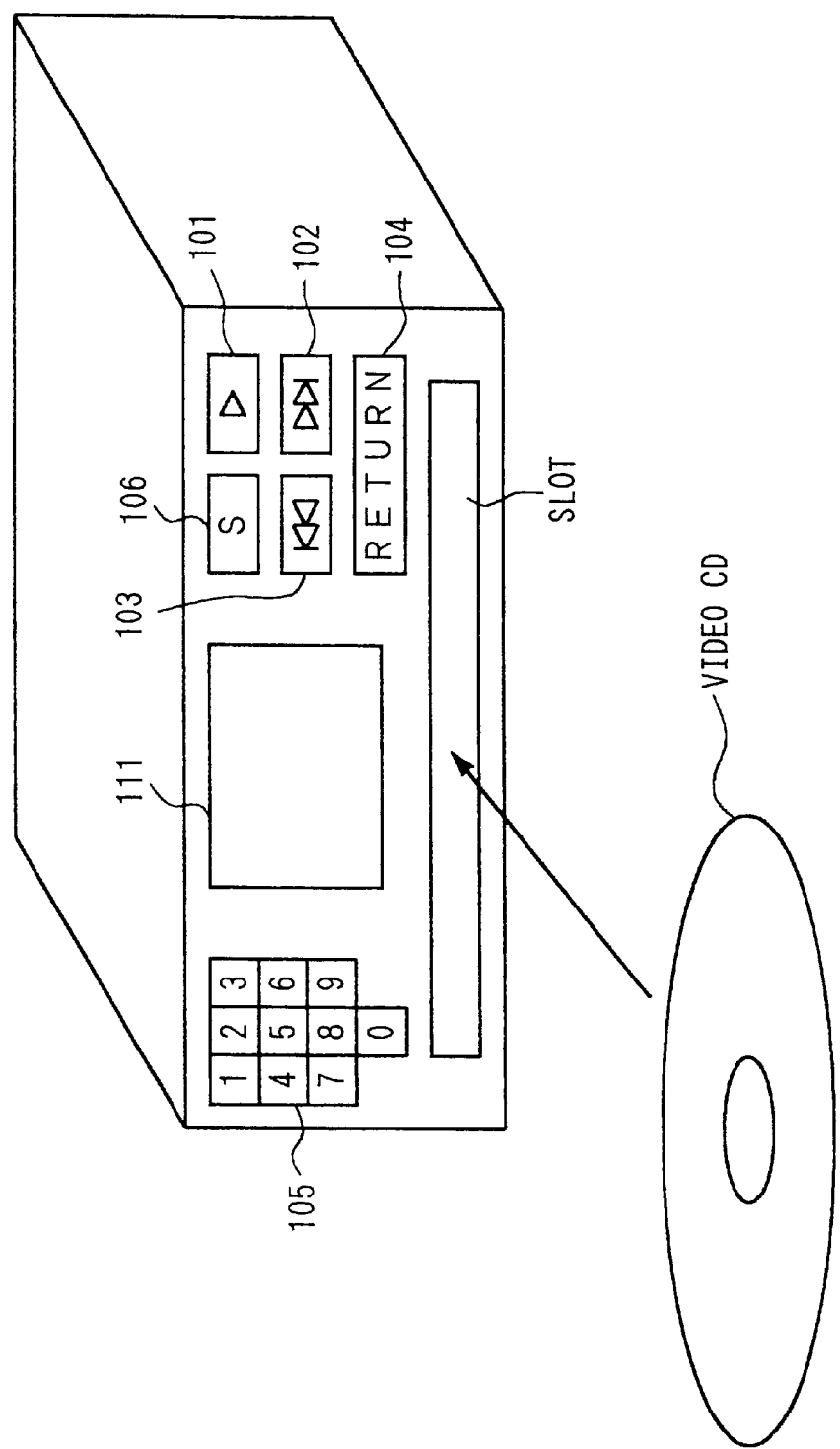
FIG. 4 is a schematic diagram showing an outer view of a video CD playback apparatus according to an embodiment of the present invention.

FIG. 4 is a schematic diagram showing an outer view of a video CD playback apparatus according to an embodiment of the present invention. A video CD is inserted from a slot and played back. A display portion 111 displays a track number and required information of the video CD that is being played back.

A playback key 101, a next key 102, and a previous key 103 are pressed basically to play back a video CD, perform a jump to the next track (or perform fast forward operation), and perform a jump to the previous track (perform rewind operation), respectively. In addition to the playback key 101, the next key 102, and the previous key 103, a return key 104, a numeric key pad 105, and a select key 5 are provided.

Pictures and audio played back from the video CD are supplied to a monitor and a speaker (not shown) through an output terminal of the playback apparatus, respectively.

When a video CD is played back, MPEG audio data, MPEG video data, and CD-DA data that have been recorded on the track Tr2 or later shown in FIG. 2 are sequentially played back. In addition, pictures and audio are played back corresponding to the PBC recorded in the PSD portion in an interactive menu manner.

As described above, the PBC includes the play list (PL), the selection list (SL), and the end list. In the play list and the selection list, moving pictures, still pictures (a still picture sequence), and audio and a playback sequence of menu still pictures are stored, respectively. Corresponding to the PBC, pictures and audio are interactively played back in for example the following manner.

Figure 5:
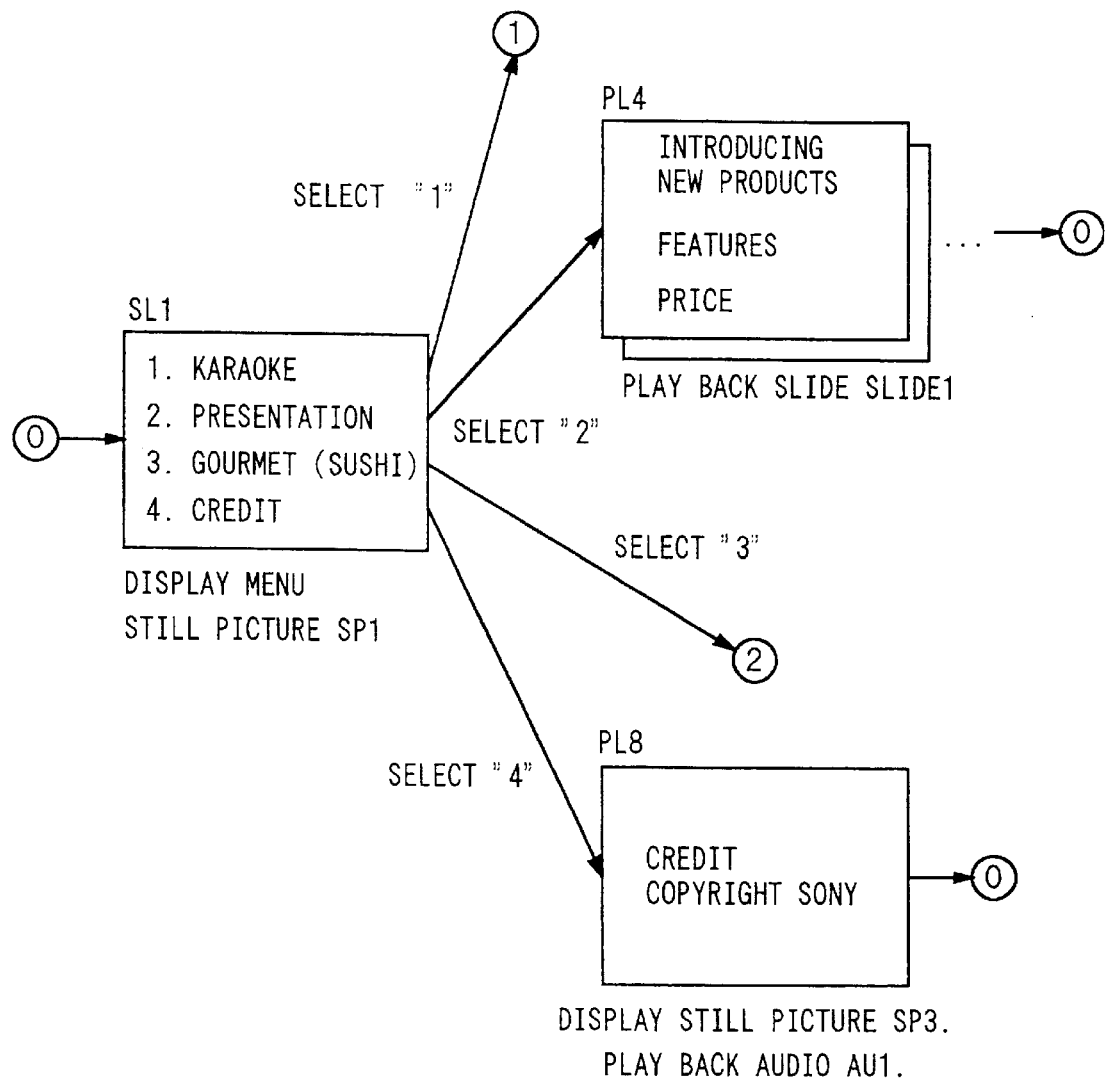
FIG. 5 is a schematic diagram showing a state transition of which pictures and audio are played back with a PBC in an interactive method (No. 1)

When the recorded contents of a video CD are as shown in FIG. 2, a menu still picture SP1 as shown in FIG. 5 is displayed corresponding to a selection list SL1 of the PBC. After the menu still picture SP1 is displayed, a user's entry is prompted. In this case, there are four options. When "1" to "4" keys of the numeric key pad 105 (see FIG. 4) are pressed, jumps are performed to a selection list SL2 (see FIG. 6), a play list PL4 (see FIG. 5), a selection list SL4 (see FIG. 7.), and a play list PL8 (see FIG. 5), respectively.

Figure 6:
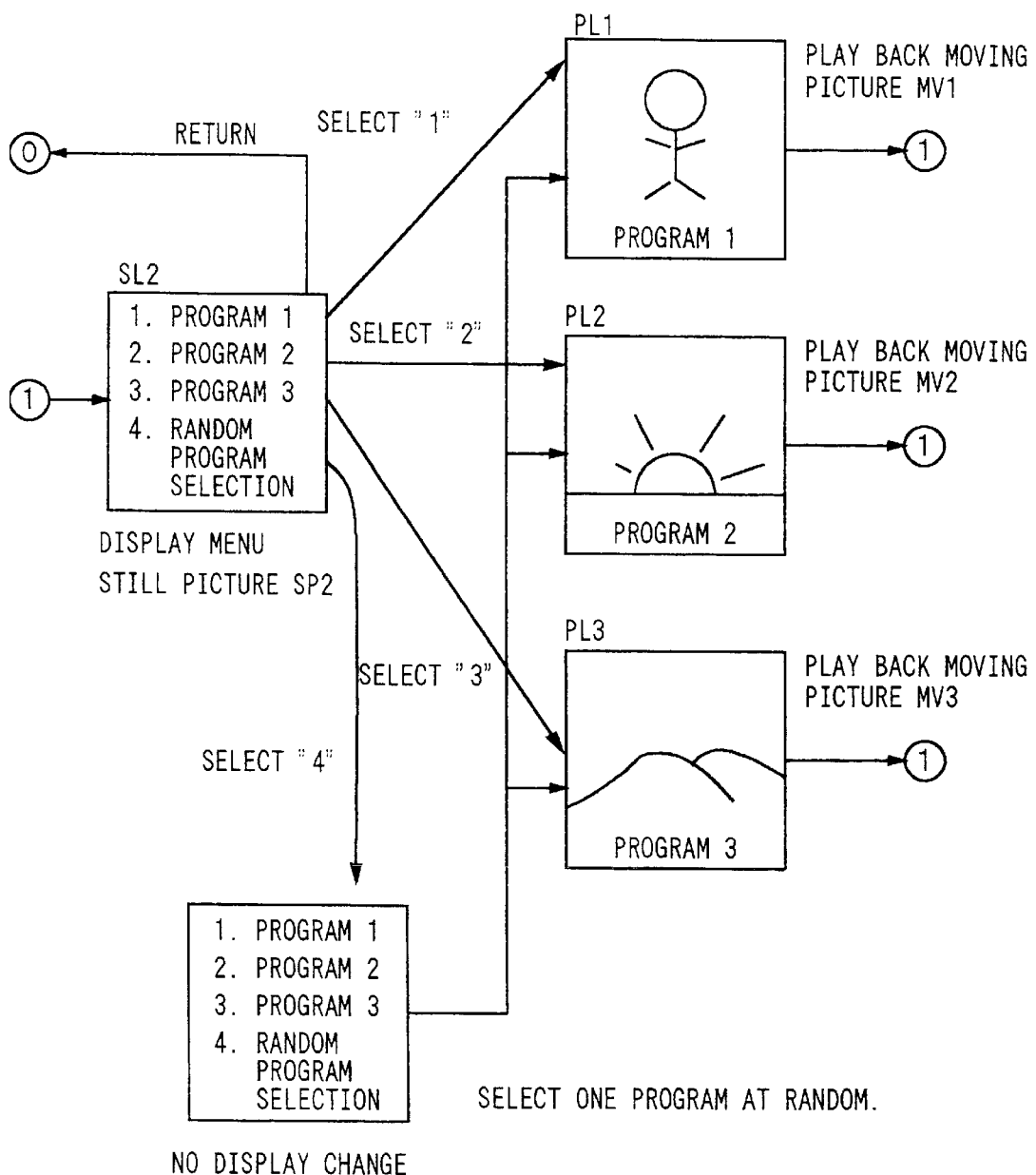
FIG. 6 is a schematic diagram showing a state transition of which pictures and audio are played back with the PBC in the interactive method (No. 2)

When the "1" key of the numeric key pad 105 is pressed, a menu still picture SP2 as shown in FIG. 6 is displayed corresponding to the selection list SL2 and a user's entry is prompted. In this case, there are four options. When the "1" to "4" keys of the numeric key pad 105 are pressed, jumps are performed to play lists PL1, PL2, PL3, and a selection list SL3, respectively.

While the menu still picture SP2 is being displayed and the return key 104 (see FIG. 4) is pressed, a jump to, for example, the selection list SL1 is performed. Thus, the menu still picture SP1 shown in FIG. 5 is displayed.

While the menu still picture SP2 is being displayed and the "1" key of the numeric key pad 105 is pressed, for example, the moving picture MV1 is played back corresponding to the play list PL1. After the playback of the moving picture MV1 is finished, a jump to, for example, the selection list SL2 is performed. Thus, the menu still picture SP2 is displayed. While the moving picture MV1 is being played back and the return key 104 is pressed, a jump to the selection list SL2 can be performed.

When, for example, the "2" and "3" keys of the numeric key pad 105 are pressed, the moving pictures MV2 and MV3 are played back corresponding to the play list PL2 and PL3, respectively. After the playback of the moving picture is finished, a jump to, for example, the selection list SL2 is performed and the menu still picture SP2 is displayed. In this case, while the moving picture MV2 or MV3 is being played back and the return key 104 is pressed, a jump to the selection list SL2 can be performed.

When the "4" key of the numeric key pad 105 is pressed, a jump to one of the play lists PL1 to PL3 is randomly performed corresponding to the selection list SL3 without a change of the display (namely, while the menu still picture SP2 is being displayed). After a jump to one of the play lists PL1 to PL3, the above-described menu is displayed.

Returning to FIG. 5, while the menu still picture SP1 is being displayed, when the "2" key of the numeric key pad 105 is pressed, a slide SLIDE1 is played back corresponding to the play list PL4 (namely, still pictures of the still picture sequence are successively played back). After the playback of the slide SLIDE1 is finished, a jump to the selection list SL1 is performed. In this case, while the slide is being played back (for example, intervals of still pictures of the slide), pauses of a predetermined period (for example, 5 seconds as will be described later with reference to FIGS. 20A and 20B) can be placed.

Figure 7:
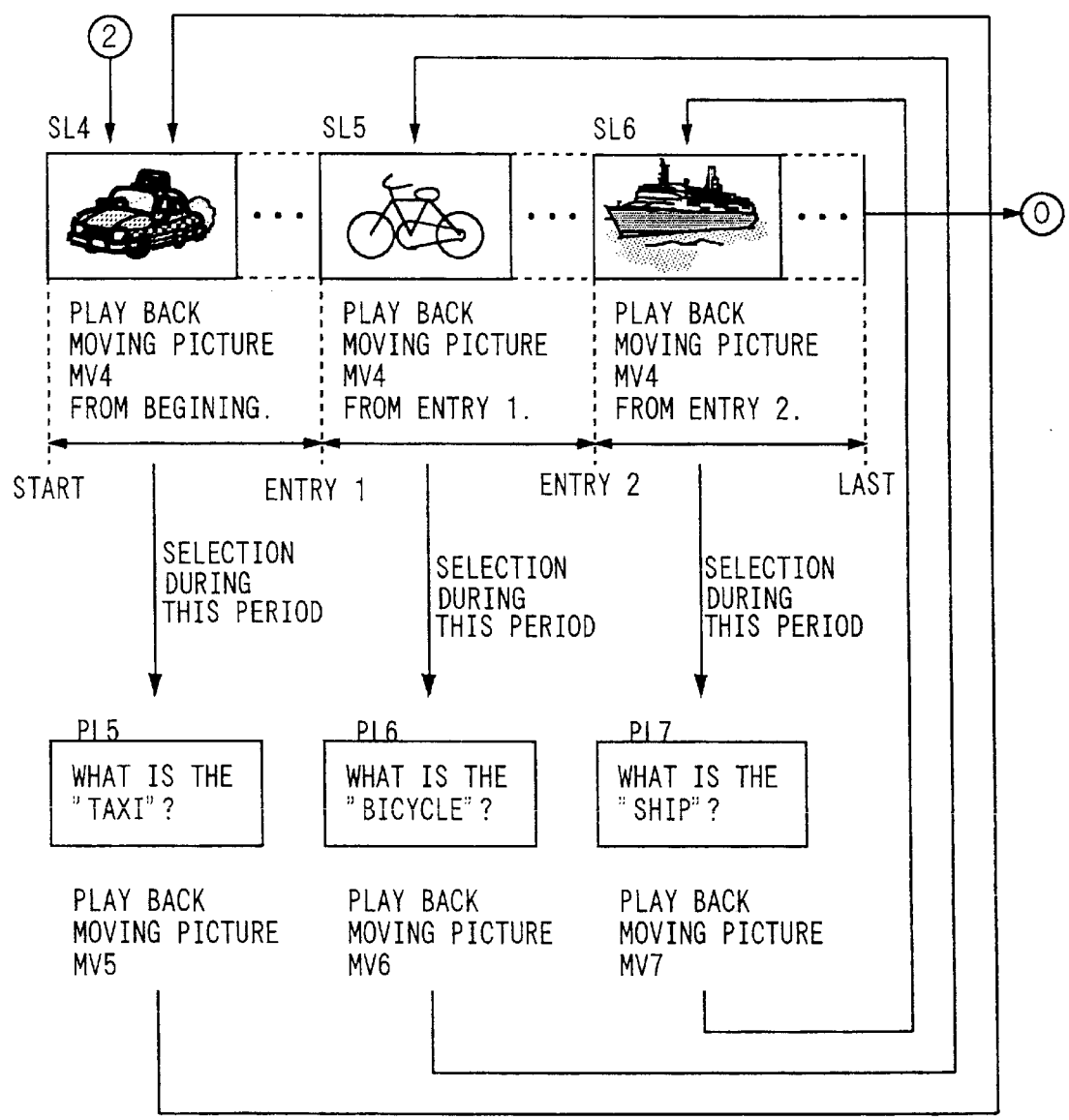
FIG. 7 is a schematic diagram showing a state transition of which pictures and audio are played back with the PBC in the interactive method (No. 3)

When the "3" key of the numeric key pad 105 is pressed, the moving picture MV4 is played back corresponding to the selection list SL4 as shown in FIG. 7.

When an entry that has been defined to the moving picture MV4 is defined, a playback can be performed in the following manner. If two entries that are entry 1 and entry 2 have been defined to the moving picture MV4, (for example, data of a taxi is being played back from the beginning of the moving picture MV4 to the entry 1, data of a bicycle from the entry 1 to the entry 2, and data of a ship from the entry 2 to the end of the moving picture MV4 are being played back), when the playback key 101 is pressed, jumps are performed to the play lists PL5, PL6, and PL7, respectively.

Corresponding to the play lists PL5 to PL7, the moving pictures MV5 to MV7 that are detail portions of the moving picture MV4 are played back, respectively. After the playback of the moving pictures MV5 to MV7 is finished, jumps to the selection lists SL4 to SL6 are performed, respectively. According to the selection list SL4, as described above, the moving picture MV4 is played back from the beginning. In addition, according to the selection lists SL5 and SL6, the moving picture MV4 is played back from the entry 1 and 2, respectively.

When the playback of the moving picture MV4 is finished, a jump to the selection list SL1 is performed. Thus, the menu still picture SP1 (see FIG. 5) is displayed.

Returning to FIG. 5, while the menu still picture SP1 is being displayed, when the "4" key of the numeric key pad 105 is pressed, for example, a still picture SP3 is displayed corresponding to the play list PL8. Thereafter, an audio AU1 is output (played back). After the output (playback) of the audio AU1 is finished, a jump to the selection list SL1 is performed. Thus, the menu still picture SP1 is displayed.

Thus, in the video CD, according to the PBC recorded in the PSD portion shown in FIG. 2, pictures and audio can be played back in an interactive menu manner.

Figure 8:
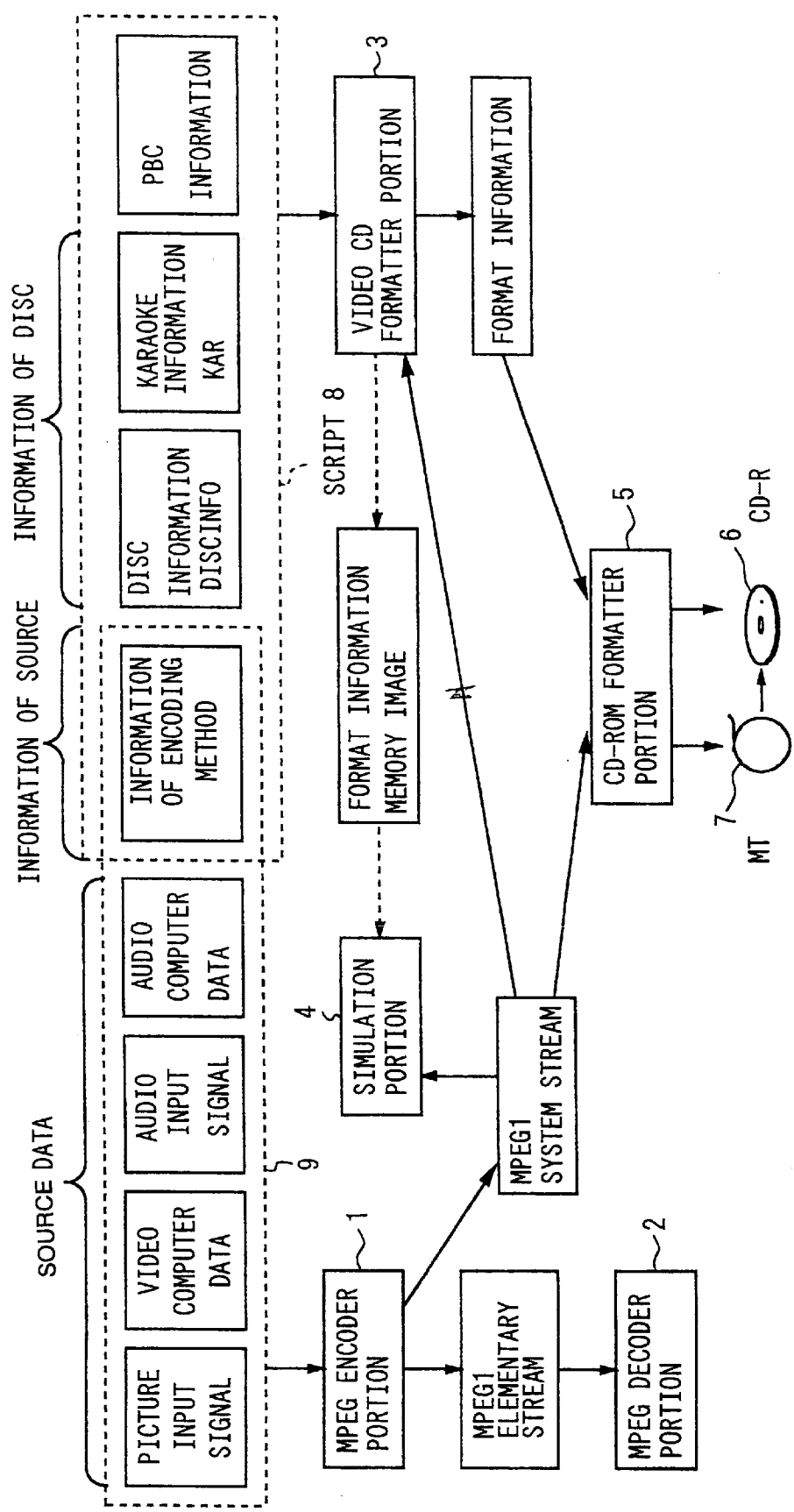
FIG. 8 is a block diagram showing a construction of an authoring system according to an embodiment of the present invention.

FIG. 8 is a block diagram showing an authoring system for authoring the above-described video CD according to an embodiment of the present invention. A script 8 and source data (video data and audio data) 9 are input to the system. The script 8 is used to author a video CD. The source data is an object to be authored. The source data 9 is processed corresponding to the script 8. Thus, a video CD is produced. Hereinafter, a set of the source data 9 and the script 8 is referred to as COFF (Common Omni File Format).

An author of a video CD needs only the COFF. In the authoring system, a video CD (or data with a format necessary for producing a video CD) is automatically produced corresponding to the input COFF.

As the source data 9, (1) pictures and audio including time codes such as an SMPTE format played back from for example a digital/analog VCR and a DAT, (2) an MPEG and an AVWAVE (movie formats played back on a computer defined by Video For Windows), (3) a WAVE (audio file format used in Windows), and (4) data such as TIFF and PICT can be used. These types of source data can be input from for example a VCR, a DAT, a computer, and an other unit (for example, an optical disc unit, a magneto optical disc unit, a magnetic disk unit (hard disk unit), a magnetic tape unit, and the like) to the authoring system when necessary.

The script 8 of the COFF includes three types of information that are "information of disc", "information of source", and "information of PBC", each of which can be defined in a tabular format. The "information of disc", the "information of source", and the "information of PBC" are recorded as files to for example a floppy disk so that they are read to the authoring system. Although the "information of disc" and the "information of source" are essential, the "information of PBC" can be omitted. In other words, when a playback is not performed in the above-described interactive manner, it is not necessary to input the "information of PBC".

The "information of disc" includes DISCINFO and KAR. The DISCINFO is information of the entire disc. The KAR is KARAOKE information.

The "information of source" is process information for causing the authoring system to perform a process. The "information of source" includes MOVIE, AUDIO, STILL, SLIDE, ENCODED, ENTRY, and APAUSE. In the MOVIE, the AUDIO, and the STILL, information designating encoding methods of moving pictures, audio, and still pictures are defined, respectively. In the SLIDE, information of a structure of slides (a still picture sequence) of source data (still pictures) defined in the STILL is defined. When source data (audio) defined in the AUDIO is used for a slide, this information is also defined in the SLIDE. When video data and audio data that have been encoded corresponding to for example the MPEG method are used as source data, the information of the source data is defined in the ENCODED.

In the ENTRY, information of entries that defines the playback start positions of moving pictures are defined. In the APAUSE, positions of pauses are defined with time codes.

The "information of PBC" includes PLAY, MENU, RAND, DEF1, and DEF2. In the PLAY, the information of the above-described play list (PL) and so forth are defined. In the MENU, RAND, DEF1, and DEF2, the information of the above-described selection list (SL) and so forth are defined.

In the MENU, information of a play list and a selection list jumped from a particular selection list corresponding to the operation of for example the numeric key pad 105 (see FIG. 4) is defined. In the RAND, information of a play list and a selection list jumped upon occurrence of a time out (a predetermined time period elapses after a jump to a particular play list or a particular selection list) is defined.

In the DEF1 and DEF2, information of a multi-default function is defined. In other words, in the DEF1 and DEF2, information of a play list or a selection list jumped corresponding to the operation of the next key 102, the previous key 103, the return key 104, the numeric key pad 105, and the select key 106 and corresponding to an area (divided by an entry) that is being played back while the key is being operated is defined. The DEF1 relates to the next key 102, the previous key 103, the return key 104, the numeric key pad 105, and the select key 106. The DEF2 relates to these keys other than the numeric key pad 105.

With reference to FIGS. 9 to 24, the definition format of each script will be described. Each script is defined in the a tabular format by for example an author of a video CD.

FIG. 9 shows DISCINFO (disc information) that is included in "information of disc". In an album ID field, an album name is defined with characters corresponding to ISO646. The number of characters for the album name is up to 16 characters. In an authoring system (a video CD formatter portion 3 (see FIG. 8) that will be described later), the album name is recorded in the file INFO.VCD (see FIG. 3).

The characters corresponding to ISO646 are numeric characters (0 to 9), alphabetic uppercase and lowercase characters (A to Z and a to z), sign set 1 (!"#&'( )*+−./: ;<=>?_""(space)), sign set 2 (#$), sign set 3 (−[¥]`{|}−), and control codes. The sign sets 2 and 3 have restrictions for use.

In a "number of volumes in album" field, the total number of volumes of an album is defined with a numeric character. In the authoring system (video CD formatter portion 3 (see FIG. 8), the number of volumes in album is recorded in the file INFO.VCD (see FIG. 3). In the case of video CD Ver. 1.1, the number of volumes in albums is also recorded in the PVD portion (see FIG. 2). Since data placed in the PVD portion is transparent to the user as a file, it is not shown in the directory structure of the video CD shown in FIG. 3.

In a "volume number" field, the sequence number of volumes in album is defined with a numeric character. As with the "number of volumes in album", the volume number is recorded in the file INFO.VCD (see FIG. 3) and the PVD portion (see FIG. 2) (in the case of video CD Ver. 1.1).

In a "volume ID" (Volume Identifier) field, a unique ID designated to a video CD is defined with numeric characters (0 to 9) and/or alphabetic upper case characters (A to Z) (hereinafter, this character set is referred to as d-char). The number of characters used for the volume ID is up to 32 characters. The volume ID is recorded in the PVD portion (see FIG. 2).

In a "volume set ID" (Volume Set Identifier) field, a name for a series of video CDs is defined with d-char. The number of characters for the volume set ID is up to 128 characters. As with the volume ID, the volume set ID is recorded in the PVD portion (see FIG. 2).

In a "publisher" (Publish Identifier) field, a publisher name is defined with numeric characters (0 to 9), alphabetic uppercase characters (A to Z), and sign set 1 (!"#&'( )*+−./: ;<=>?_""(space)). Hereinafter, this character set is referred to as a-char. The number of characters for the publisher name is up to 128 characters. The first character of the publisher name should be other than a space (character code $20 ($ represents HEX)). Trailing spaces of the publisher name are ignored. As with the volume ID and the volume set ID, the publisher name is recorded in the PVD portion (see FIG. 2).

In a "data provider" (Data Preparer IDentifier) field, a data provider name is defined with an a-char. The number of characters, other restrictions, and record position on a video CD for the data provider are the same as those of the publisher name.

In a "date and time of publication" (Volume Creation Date and Time) field, date (year, month, and day) and time (hour, minute, and second) of publication of a video CD are defined. The year should be listed with four numeric characters that represent a Christian year. Each of the month, day, hour, minute, and second should be defined with two numeric characters. Thus, when the digit of "10" of each of month, day, hour, minute, and second is "0", the numeric character "0" should be also defined. In addition, the hour should be defined in 24 hour system. Moreover, between the sequence of year, month, and day and the sequence of hour, minute, and second, one space should be placed.

Thus, for example "Mar. 3, 1994, 10 pm" is defined as "1994/03/03 22:00:00".

As with the volume ID, the volume set ID, and the data provider name, the date and time of publication is recorded in the PVD portion (see FIG. 2). When the definition of the "date and time of publication" field is omitted, a proper definition of date and time of publication is recorded in the PVD portion.

In a "disc title" (Disc Title) field, a title of a video CD is defined with shift JIS characters. In other words, a disc title cannot be defined with Chinese characters. The disc title is recorded in the file KARINFO.JP (KARINFO.cc) (see FIG. 3).

In a "catalog number" (Disc Catalog Number) field, a catalog number of a video CD is defined with characters corresponding to ISO646. As with the disc title, the catalog number is recorded in the file KARINFO.JP (see FIG. 3).

In a "number of programs" (Total Number of Sequence on the Disc) field, the number of tracks of moving pictures recorded on a video CD (namely, the number of tracks on which moving pictures are recorded on the track Tr2 or later) is defined. As described above, since MPEG data can be recorded on the tracks Tr2 to Tr99 of a video CD, as the number of programs, one of 1 to 98 is defined. As with the disc title and the catalog number, the number of programs is recorded in the file KARINFO.JP (see FIG. 3).

The "number of programs" field is followed by a system reserved area.

FIG. 10 shows a definition format of KAR (KARAOKE information) that is included in "information of disc". The KAR defines a source name, an ISRC (International Standard Recording Code) corresponding to ISO3901, a title, a title (sort key) used as a keyword for sorting, a singer, and a singer (sort key) used as a keyword for sorting.

In the "source name" field, a source name of source data used for KARAOKE (that is defined in "source information" as will be described later) is defined. In the "ISRC" field, an ISRC of the source data with the source name defined in the "source name" field is defined with half size alphabetic upper case characters and half size numeric characters. The number of characters for the source name is fixed to 12. In the "title" field, a program name of KARAOKE is defined with shift JIS double size or half size characters. In the "title (sort key)" field, a name of a program of KARAOKE is defined with KANA characters. The name of the program defined in this field is sorted by a player or the like that has a sorting function of which program names are sorted in Japanese 50 character order.

In the "singer" field, a name of a signer who sings the song of KARAOKE is defined with shift JIS double size or half size characters. In the "singer (sort key)" field, the name of a singer is defined with KANA characters. As with the name of the singer defined in the "title (sort key)" field, the name of the singer defined in the field is used to sort the names of singers.

The KAR can have fields for a writer, a composer, an arranger, a player, an introduction of a program, a KARAOKE key, an original key, and other information (not shown). The KARAOKE key is a key (high and low tones) arranged for KARAOKE (namely, a combination of {C, D, E, F, G, A, B, Ut, Re, Mi, . . . }, {#, b}, and {m}. For example, "B flat minor" is denoted by Bbm. The original key is a key of a singer who originally sings a song.

In the KAR, the definitions of the fields for the source name, the ISRC, the title, the singer, the composer, and the writer are mandatory. The other fields are optional. In other words, the definitions of the fields for the title (sort key), the singer (sort key), the composer, the player, the introduction, the KARAOKE key, the original key, and the other information are optional.

The KAR (KARAOKE information) is recorded in the files KARINFO.BIH and KARINFO.JP (see FIG. 3). The ISRC, the KARAOKE key, and the original key are defined with only half size characters. The other fields can be defined with both the half size characters and shift JIS characters (other than half size KANA characters). The type of character set used for the file KARINFO.cc depends on the extension cc.

Since the KAR has many optional fields, if the author of a video CD needs only part of all the fields, undesired fields may be troublesome.

To solve such a problem, when the KAR is defined, for example as shown in FIG. 11, each field name is preceded by a colon and a numeric character (excluding the case of the source name) for omitting the undesired fields rather than defining field names as shown in FIG. 10.

In this case, unique numeric characters that represent field names have been defined. The authoring system determines a field name corresponding to a number that is followed by a colon. Thus, when the KAR is defined, undesired fields can be omitted. In addition, other fields can be defined by the user (for example, fields for description of a program and a text). Moreover, field names can be changed as the author of the video CD wants (for example, the "ISRC" can be chanced to "work management number" or "singer" to "vocalist"). Furthermore, numeric characters and colons can be used instead of field names. In addition, the order of field names (excluding the source name) can be freely changed unlike with the fixed order of "IRSRC, title, . . . " shown in FIG. 10 (FIG. 11) as the author of the video CD wants.

When the format of the first line of the KAR is "(numeric character):(field name)" as shown in FIG. 11, the numeric characters and the field names are placed as item numbers and text data of the file KARINFO.JP, respectively (see FIG. 3).

Figure 12:
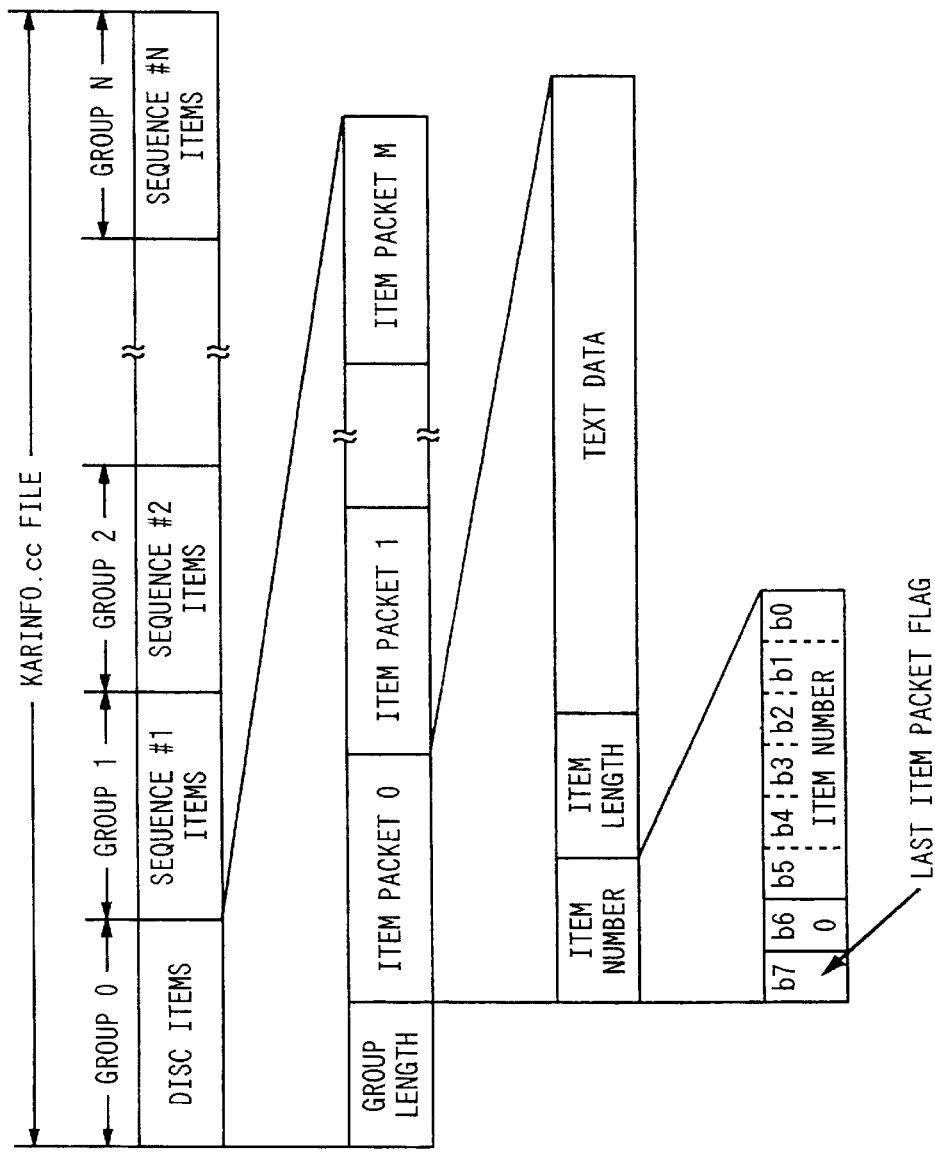
FIG. 12 is a schematic diagram showing a format of a file KARINFO.JP (KARINFO.cc)

FIG. 12 shows the format of the file KARINFO.JP (KARINFO.cc). The file KARINFO.JP is divided into a plurality of groups (Group 1, 2, . . . , N). In the group 0 (Group0), information of a video CD "Disc Items" is placed. In the group 1 (Group1) to the group N (GroupN), information of a file AVSEQ#n.DAT (Sequence #n Items) included in the MPEGAV directory shown in FIG. 3 is placed (where #n is a numeric value preceded by Group).

Each group is composed of a group length and at least one item packet. The group length represents the number of bytes of the item packet.

The item packet is composed of an item number, an item length, and text data. The item number is composed of eight bits. The high order two bits of the item number are defined corresponding to predetermined information. The low order six bits Of the item number are defined corresponding to the numeric character of "(numeric character):(item name)".

The item length defines the number of bytes of the text data. The text data defines the item name of the "(numeric character):(item name)".

The format of "(numeric character):(item name)" of the first line can be applied for the DISCINFO and other information that will be described with reference to FIGS. 13 to 24 as well as the KAR.

FIG. 13 shows a definition format of the MOVIE included in "information of source" in the case that source data (a moving picture (pictures and audio)) is played back by for example a digital video tape recorder (DVTR).

In a "source name" field, a unique name that represents source data is defined with alphabetic characters and numeric characters. Although the alphabetic uppercase and lowercase characters can be used, they are not distinguished. The number of alphanumeric characters and numeric character for the source name is up to 20 characters.

In a "start" field and an "end" field, time codes of a start portion and an end portion of source data that has been recorded on a video tape of a DVTR and that is recorded on a video CD are defined, respectively.

In a "location" field, for example "track" is defined in the case that source data is placed on a track (track Tr2 to Tr99 (see FIG. 2) of a video CD or for example "segment" is defined in the case that source data is placed in the SPIM portion of the video CD (see FIG. 2). Thus, in the MOVIE shown in FIG. 13 source data with source names "MV1", "MV2", and "MV4" is placed on tracks of the video CD and source data with source names "MV5" to "MV7" is placed in the SPIM portion of the video CD.

Generally, a completed moving picture is recorded on tracks (tracks Tr2 to Tr99) of the video CD. An intermittent moving picture that is used to be changed from one scene to another scene is recorded in the SPIM portion. Although a player of video CD version 2.0 can play back data (pictures and audio) recorded on tracks or in the SPIM portion, a player of video CD version 1.1 can play back data recorded on tracks, not in the SPIM portion.

In an "audio rate" field, encoding rate of audio of source data is defined. When the source data is recorded in the SPIM portion, one of encoding rates 64 kbps, 96 kbps, 128 kbps, 192 kbps, 224 kbps, and 384 kbps can be selected. However, when the source data is recorded on tracks, the encoding rate is a fixed rate of 224 kbps.

In an "audio mode" field, an audio mode of the source data is defined. One of audio modes that are stereo (standard stereo audio) corresponding to ISO-11172-2, intensity (high quality stereo audio), dual (left and right independent audio), and monaural (monaural audio)can be selected.

When the source data is recorded in the SPIM portion and the monaural mode is selected, the rate should be selected from 64 kbps, 96 kbps, and 192 kbps. When the source data is recorded in the SPIM and a mode other than the monaural mode is selected, the rate should be selected from 128 kbps, 192 kbps, 224 kbps, and 384 kbps.

When the definition of the "location" field is omitted, the source data is recorded on tracks or in the SPIM portion (for example, in the SPIM portion). when the definition of the "audio rate" field or the "audio mode" field is omitted, the rate or the mode is treated as for example 224 kbps or stereo, respectively.

FIG. 14 shows a definition format of the STILL included in "information of source" in the case that source data (still pictures) that is recorded on, for example, an magneto optical disc (MO) connected to a computer is played back.

As with the above-described MOVIE, in a "source name" field, a unique name that represents source data is defined. In a "file name" field, the name of a file of the source data on the magneto optical disc is defined. The file name on the magneto optical disc should be a file name corresponding to for example MS-DOS (trade mark). The file name is defined including a path name. However, a drive name can be omitted.

In a "format" field, the format of the source data recorded with the file name defined in the "file name" field is defined. When the source data is for example general-purpose RGB format data or TIFF data, "RGB" or "TIFF" is defined in the "format" field. In a "resolution" field, the resolution of source data is defined. In other words, when the source data is high resolution data (data of high resolution or mixture of high resolution data and normal resolution data) or normal resolution data, for example "H" or "N" is defined in the "resolution" field, respectively.

FIG. 15 shows a definition format of the AUDIO included in "Information of source" in the case that source data (audio) is recorded on for example a DAT and played back therefrom.

In a "source name" field, a "start" field, an "end" field, an "audio rate" field, and an "audio mode" field, the same items as those of the MOVIE shown in FIG. 13 are defined. The restrictions of the definitions of the fields of the AUDIO are the same as those of the MOVIE.

FIG. 16 shows a definition format of the SLIDE included in "information of source". In a "slide source name" field, a unique name (slide source name) that represents a slide that is a sequence of at least one still picture is defined. When a slide source name is defined, a "source name" field on the same line is blanked. In addition, "ABS" or "REL" is defined in a "time code" field on the same line (this detail will be described later).

In the "source name" field on the next line, the source name of source data of audio that is output in synchronization with the display of the still picture sequence is defined. In FIG. 16, source data with a source name "AU2" (namely, as described in the AUDIO of FIG. 15, source data (audio) recorded from time code 01:02:00:00 to 01:02:50:00) is source data of audio that is output in synchronization with the display of the still picture sequence. When a slide is displayed without audio, the definition of the source name of the source data is not required. When a slide source name is defined, the "slide source name" field on the same line is blanked.

In the "time code" field on the right of the "source name" field in which the source name of audio is defined, a time code at which source data of the audio is started is defined in the case that the time code at the start of the slide display is 00:00:00:00. Generally, a slide is displayed in synchronization with a playback of audio. In this case, "00:00:00:00" is defined in the "time code" field.

In "source name" fields two lines below the line of the "slide source name" in which the slide source name is defined, source names of source data of a still pictures that composes the slide are defined. In FIG. 16, the source data of the still-pictures with the source names "OHP1" to "OHP5" defined in the SLIDE shown in FIG. 14 are source data that composes the slide. The "slide source name" fields on the lines of which source names of source data of the still pictures that compose the slide are defined are blanked. that compose the slide are defined are blanked.

In "time code" fields on the right of the "source name" fields, time codes of which the still pictures are displayed are defined. Still pictures (as well as pictures that compose a moving picture and audio) are encoded and recorded on a video CD. The time codes defined in the "time code" fields are timings at which the still pictures are displayed, rather than timings of which still pictures are played back from a video CD or decoded. Since it takes approximately one second to play back, decode, and display a still picture, the time codes should be defined from this point of view.

When "ABS" or "REL" is defined in a "time code" field on the line of which a slide source name is defined, the "ABS" defines time in the case that the slide display start time code is 00:00:00:00 (absolute time code) and the "REL" defines time in the case that the display start time of the just preceding a still picture is 00:00:00:00 (relative time code).

The SLIDE shown in FIG. 16 defines information for causing the authoring system shown in FIG. 8 to perform a video CD authoring process so as to display the still picture with the source name "OHP1", output the audio with the source name "AU2", and then sequentially display the still pictures with the source names "OHP2", "OHP3", "OHP4", and "OHP5" at intervals of 10 seconds, 20 seconds, 30 seconds, and 40 seconds.

The authoring system shown in FIG. 8 interleaves the source data of the audio with the source name "AU2" and the source data of the still pictures with the source names "OHP1" to "OHP5" corresponding to the SLIDE so as to generate a sequence of data that composes a slide show.

In FIG. 16, the time codes on the right of the source names of the still pictures that compose the slide are defined as absolute time codes. However, it should be noted that the time codes can be defined as relative time codes.

In the "source name" field on the next line of the line of which the source name "OHP5" of the last still picture is defined, for example "end" (not shown) is defined. In a "time code" field on the right of the "end", a time code that represents the display end time of the last still picture (the still picture with the still picture name "OHP5" in FIG. 16) is defined. When the "end" is not defined, the display is completed at the end of the still pictures (sequence) and the audio file that compose a slide. In other words, in the example shown in FIG. 16, at the time of the absolute time code 00:00:50:00 (=01:02:50:00−01:02:00:00) (namely, the output of the source data of the audio with the source name "AU2" is finished), the display of the still picture with the still picture name "OHP5" is finished.

The character set that can be used for the slide source name and the source name are the same as those of the above-described MOVIE.

FIG. 17 shows a definition format of the ENCODED included in "information of source" in the case that source data (video data and audio data that have been encoded corresponding to MPEG1 (they are sometimes referred to as encoded data) is recorded on for example a magneto optical (MO) disc connected to a computer, read therefrom, and recorded on a video CD.

As with the above-described MOVIE, in a "source name" field, a unique name that represents data that has been encoded is defined. In a "file name" field, a file name of encoded data on a magneto optical disc (or a file name on a hard disk) is defined. A file name is defined including a path name. However, a drive name can be omitted.

In a "type" field, for example one of a moving picture, a still picture, and an audio is defined. When encoded data is a moving picture, as shown in FIG. 17, "movie" is defined in the "type" field. In a "location" field, for example "track" is defined in the case that encoded data is placed on tracks (track Tr2 to Tr99 (see FIG. 2) of the video CD or for example "segment" is defined in the case that the encoded data is placed in the SPIM portion (see FIG. 2) of the video CD.

In the ENCODED SOURCE shown in FIG. 17, encoded data with a file name "¥kar3.mpg" on a magneto optical disc is placed on tracks of a video CD as source data with a source name "MS3".

FIG. 18 shows a definition format of the ENTRY included in "information of source". In a "source name" field, the source name of source data for which an entry is placed is defined. In second and later fields, time codes (SMPTE time codes) corresponding to positions of entries of source data on a recording medium are defined.

In the ENTRY shown in FIG. 18, entries are defined to source data with a source name "MV4" defined in the MOVIE shown in FIG. 13.

When a source name of source data for which an entry is placed is defined in the "source name" field, if the second or later field is blanked, the entry for the source data is not defined.

In this embodiment, entries can be defined to source data of a moving picture that is placed on tracks (track Tr2 to Tr99 (see FIG. 2)) of a video CD, not in the SPIM portion (see FIG. 2) of the video CD.

In FIG. 18, there are seven time code fields for each source data. However, when necessary, the time code fields can be extended or reduced. Thus, eight or more (or six or less) entries can be defined for each source data. However, the number of time code fields is up to 98 time code fields per track.

FIG. 19 shows a definition format of the APAUSE included in "information of source". In a "source name" field, a source name of source data for which a pause is placed is defined. In a "relative/absolute" field, "ABS" or "TAPE" (that will be described later) is defined.

In third or later fields, positions of source data at which pauses are successively placed are defined with time codes. When "ABS" is defined in the "relative/absolute" field, time codes corresponding to the positions at which pauses are placed are defined in the third or later fields in the condition that the display start time of the source data is 00:00:00:00. When "TAPE" is defined in the "relative/absolute" field, time codes corresponding to positions at which pauses are placed and corresponding to the positions of a recording medium are defined in the third or later fields.

In the APAUSE shown in FIG. 19, pauses are placed in a slide (still picture sequence) with a slide source name "SLIDE1" defined in the SLIDE shown in FIG. 16.

In FIG. 19, there are five time code fields per source data. However, as with the case of FIG. 18, when necessary, the time code fields can be extended or reduced.

The MOVIE, the STILL, and the AUDIO of the "information of source" are referenced by the MPEG encoder portion 1 and the video CD formatter portion 3 of the authoring system shown in FIG. 8. The SLIDE is used when the MPEG encoder portion 1 generates an MPEG1 system stream (that is composed of packets of which a data stream of pictures or audio that has been encoded corresponding to MPEG1 (hereinafter referred to as MPEG encoding) and that includes synchronous information). The SLIDE is also referenced by the video CD formatter portion 3. The ENCODED is referenced by the video CD formatter portion 1, the simulation portion 4, and the CD-ROM formatter portion 5.

The ENTRY is referenced by the MPEG encoder portion 1. The ENTRY is used to place a sequence header to a position corresponding to an entry of an MPEG1 elementary stream (that is a stream of which pictures and audio have been encoded corresponding to MPEG) and an MPEG1 system stream (that is a portion of video data of the stream). In addition, the ENTRY is reference by the video CD formatter portion 3. The information is defined in the file ENTRIES.VCD (see FIG. 3).

The APAUSE is referenced by the MPEG encoder portion 1. The APAUSE is used to place information of positions of which pauses are placed in the MPEG1 system stream.

Characters that can be used for "information of source" are half size alphabetic characters (A to Z and a to z), half size numeric characters (0 to 9), and half size sine (_).

Figure 20A:
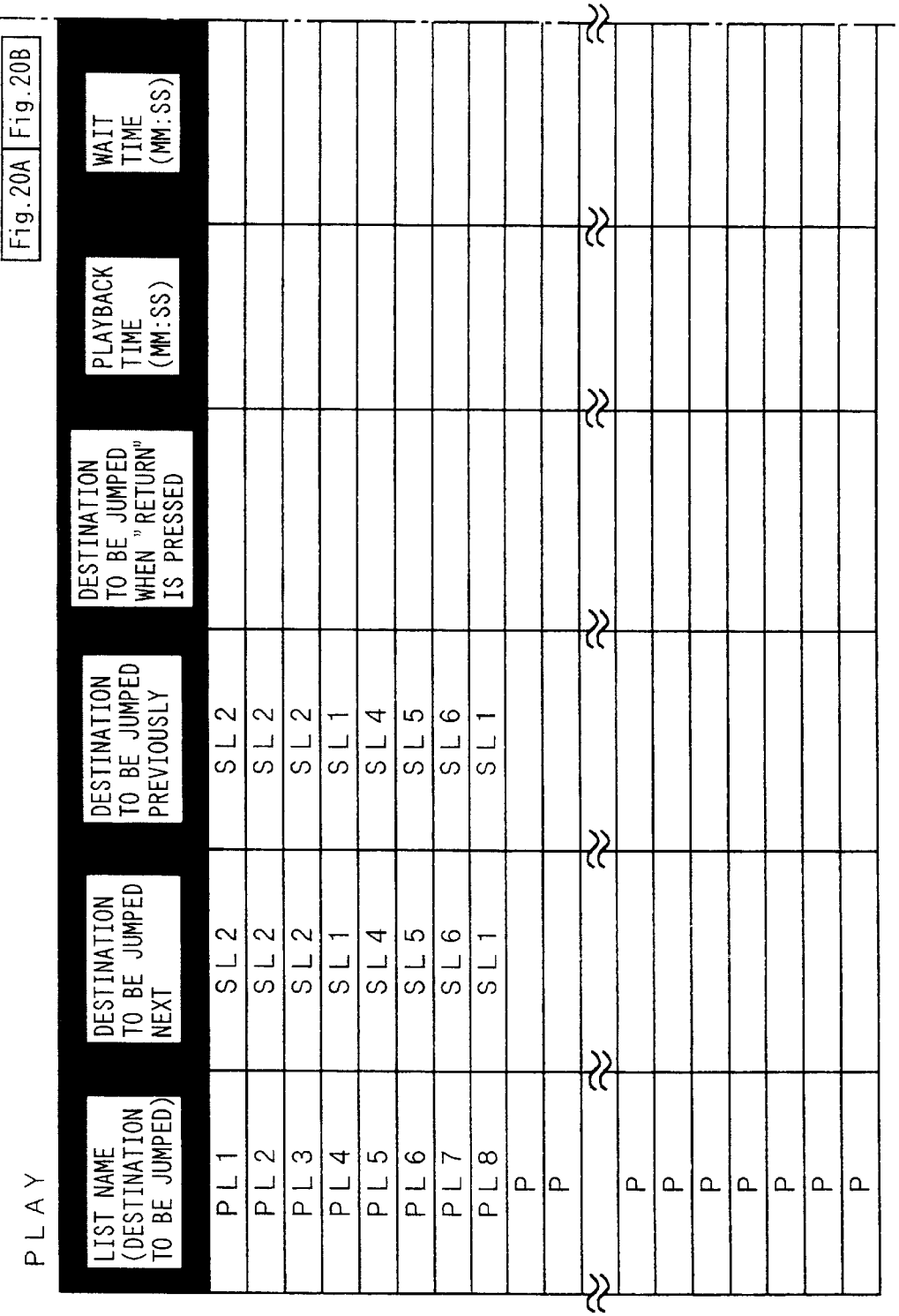

FIGS. 20A and 20B show a definition format of the PLAY included in "information of PBC". The PLAY defines information necessary for creating the above-described play list.

In a "list name (destination to be jumped)" field, a name (list name) that represents a play list is defined. In a "destination to be jumped next" field, a list name of a play list, a selection list, or an end list to be jumped after a playback of a video CD is finished corresponding to the play list of the list name defined in the "list name (destination to be jumped)" field. Hereinafter, the play list, the selection list, and the end list are simply referred to as lists. When "x" is defined in the "destination to be jumped next" field or the field is blank, it is determined that there is no destination to be jumped. A list name to be jumped next is preferably defined in the "destination to be jumped next" field. When the next key 102 is pressed while the video CD is being played back, a jump to the list with the list name defined in this field is performed.

In a "destination to be jumped previously" field, a list name of a list referenced before a playback of a video CD corresponding to the play list with the list name defined in the "list name (destination to be jumped) field is defined. When "x" is defined in the "destination to be jumped previously" field or the field is blank, it is determined that there is no destination to be jumped. When the previous key 103 is pressed while the video CD is being played back, a jump to the list with the list name defined in this field is performed.

In a "destination to be jumped when return is pressed" field, the list name of the list to be jumped corresponding to the operation of the return key 104 (see FIG. 4) is defined. As with the above-described case, when "x" is defined in this field or the field is blank, it is determined there is no destination to be jumped.

In a "playback time" field, a playback time of source data with a source name defined in a "name of source to be played back" field (that will be described later) is defined. The playback time is defined in the format of (minute):(second)" in the range from for example 00:01 to 72:49. When the playback time is not defined or "0", the source data with the source name defined in the "source name" is played back to the end of the source data.

In a "wait time" field, a wait time until a jump to the list with the list name defined in the "destination to be jumped next" after the end of the playback of the source data with the source name defined in the "name of source to be played back" field is defined in the format of "(minute):(second)". The range of the wait time is for example 00:01 to 33:20. However, in the range from 00:01 to 01:00, the wait time should be defined in the unit of seconds. On the other hand, in the range from 01:00 to 33:20, the wait time should be defined in the unit of 10 seconds. When the wait time is "0" or blank, there is no wait time. When for example "−1" (or ∞) is defined to the "wait time" field, until one of the playback key 101, the next key 102, the previous key 103, the return key 104, the numeric key pad 105, and the select key 106 is pressed (namely, any key operation is performed), no action takes place. Likewise, when the "wait time" field is blank, until one of the playback key 101, the next key 102, the previous key 103, the return key 104, the numeric key pad 105, and the select key 106 is pressed (namely, any key operation is performed), no action takes place.

In an "auto pause time" field, a pause time of the source data with the source name defined in the "name of source to be played back" field is defined. In FIGS. 20A and 20B, the pause time of the source data with the source name "SLIDE1" described in FIG. 19 is five seconds. The definition format of the "auto pause time" field is the same as the definition format of the "wait time" field.

In a "name of source to be played back" field, the source name of source data to be played back corresponding to the play list defined in the "list name (destination to be jumped)" is defined. When an entry (entry point) is placed in source data, the source data can be played back from the entry. In this case, the definition format of the "name of source to be played back" field is (source name):(entry number). The entry number is a number corresponding to a position at which an entry (namely, a time code corresponding to the entry) is placed as shown in FIG. 18. In other words, in FIG. 18, the entry number of the entry placed in the "entry of program 1" field is 1. The entry number of the entry place in the "entry of program 2" field is 2.

When the "name of source to be played back" is blank, source data is not played back. In FIGS. 20A and 20B, there are only four "name of source to be played back" fields per play list. However, when necessary, the fields can be extended. However, the number of the "name of source to be played back" should be in the range for example from 1 to 99. When a plurality of source names are defined in the "name of source to be played back" fields, source data is successively played back from the left to the right.

FIGS. 21A and 21B show a definition format of the MENU included in "information of PBC". In the MENU, information for creating the above-described selection list is defined.

In a "list name (destination to be jumped)" field, a name (list name) that represents a selection list is defined. In a "name of source to be played back" field, a source name of source data to be played back corresponding to the selection list with the list name defined in the "list name (destination to be jumped)" field is defined. When an entry (entry point) is placed in source data, the source data can be played back from the entry. The definition format in this case is the same as that of the above-described PLAY.

When the "name of source to be played back" is blank, source data is not played back. Only one name of source to be played back can be defined for each selection list. In other words, only one source data can be played back corresponding to a selection list defined in the "list name (destination to be jumped)" field.

In a "destination to be jumped when next is pressed" field, a "destination to be jumped when previous is pressed" field, a "destination to be jumped when return is pressed", and a "destination to be jumped when selection is pressed", list names of lists jumped corresponding to the operations of the next key 102, the previous key 103, the return key 104, and the select key 106 are defined.

When the selection list with the list name defined in the "list name (destination to be jumped)" field is composed of a plurality of pages and there is the next page or the previous page, the list name with the selection list of the next page or the previous page is defined in the "destination to be jumped when next is pressed" field and the "destination to be jumped when previous is pressed" field, respectively.

When the "destination to be jumped when next is pressed" field, the "destination to be jumped when previous is pressed" field, the "destination to be jumped when return is pressed" field, or the "destination to be jumped when select is pressed" field is blank or for example "x" is defined in one of these fields, it is determined that there is no destination to be jumped.

In a "destination to be jumped upon occurrence of time out" field, the name of a list to be jumped upon an elapse of a time period defined in a "period of time out" field (that will be described later) after the playback of source data with the source name defined in the "name of source to be played back" field is defined.

In the "period of time out" field, a wait time after the playback of the source data with the source name defined in the "source name to be played back" field is defined. The definition format of the "period of time out" field is the same as the "wait time" field shown in FIGS. 20A and 20B.

In a "number of repetitions" field, the number of repetitions of the playback of the source data with the source name defined in the "name of source to be played back" field is defined. The range of the number of repetitions is for example from 1 to 127. When the number of repetitions is "0", the playback of the source data is repeated until one of the playback key 101, the next key 102, the previous key 103, the return key 104, the numeric key pad 104, and the select key 106 is pressed (namely, any key operation is performed). When the "number of repetitions" field is blank, the playback is performed one time.

In an "validity of immediate jumping" field, "0" or "1" is defined. In other words, to validate a reference to another list (a jump to another list) before the playback of the source data with the source name defined in the "name of source to be played back" field is finished, "1" is defined in the "validity of immediate jumping" field. Otherwise, "0" is defined to the "validity of immediate jumping" field.

In a "destination to be jumped when #n is pressed" field (where #n is an integer ranging from 0 to 9), the list name of a list that is referenced corresponding to the operation of the #n key of the numeric key pad 105 (see FIG. 4) is defined. When for example "x" is defined in this field or this field is blank, it is determined that there is no destination to be jumped. In FIGS. 21A and 21B, there are four "destination to be jumped when #n is pressed" fields per selection list. When necessary, the number of fields can be extended. However, the number of the "destination to be jumped when #n is pressed" fields is up to 10 (corresponding to the keys of the numeric key pad 105).

Figure 22B:
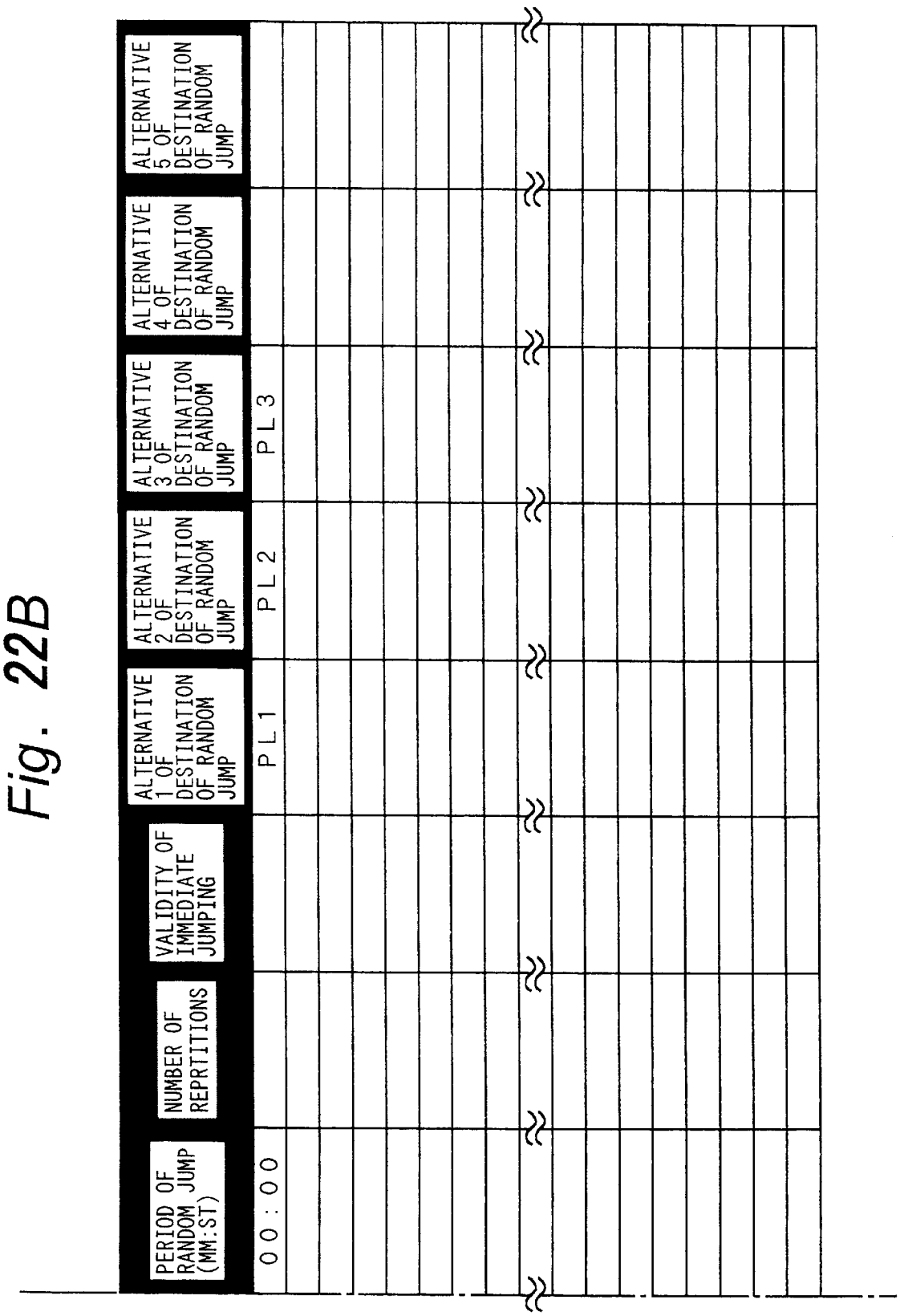

FIGS. 22A and 22B show a definition format of the RAND included in "information of PBC". In the RAND, information for creating the above-described selection list is defined. In a "list name (destination to be jumped)" field, a "name of source to be played back" field, a "destination to be jumped when next is pressed" field, a "destination to be jumped when previous is pressed" field, a "destination to be jumped when return is pressed" field, and a "destination to be jumped when select is pressed" field, the same items as those shown in FIGS. 21A and 21B are defined. In a "destination to be jumped upon occurrence of time out" field, for example "random" is defined.

In a "period of random jump" field, a wait time after the playback of the source data with the source name defined in the "name of source to be played back" field is defined. The definition format of this field is the same as the definition format of the "wait time" field shown in FIGS. 20A and 20B.

In a "number of repetitions" field and a "validity of immediate jumping" field, the same items as those shown in FIGS. 21A and 21B are defined.

In an "alternative # of destination of random jump" field (where #n is any positive integer), the list name of a list to be jumped after the playback of the source data with the source name defined in the "name of source to be played back" and an elapse of the wait time defined in the "period of random jump" is defined. An alternative of the destination to be jumped is randomly determined by a player.

When for example "x" is defined in this field or the field is blank, it is determined that there is no destination to be jumped. When necessary, the number of "alternative # of destination of random jump" fields can be extended.

FIGS. 23A and 23B show a definition format of the DEF1 included in "information of PBC". In the DEF1, information for creating the above-described selection list is defined.

In a "list name (destination to be jumped)" field, a "name of source to be played back" field, a "destination to be jumped when next is pressed" field, a "destination to be jumped when previous is pressed" field, and a "destination to be jumped when return is pressed" field, the same items as those shown in FIGS. 21A and 21B are defined. In a "destination to be jumped when select is pressed" field, for example "multi1" is defined.

In a "destination to be jumped upon occurrence of time out" field, a "Period of time out" field, a "number of repetitions" field, and a "validity of immediate jumping" field, the same items as those shown in FIGS. 21A and 21B are defined. However, in the "validity of immediate jumping" field, "1" is fixedly defined.

In a "destination to be jumped when select is pressed between entry #n to entry #n+1" field (where #n is any integer that is 0 or greater), the list name of a list to be jumped corresponding to the operation of the select key 106 (see FIG. 4) is pressed during the playback between entry #n and entry #n+1 of the source data with the source name defined in the "name of source to be played back" field is defined. Note that when #n is 0, the play back is performed between the beginning of the program and the entry 1.

Thus, when no entry is placed in the source data with the source name defined in the "name of source to be played back" field, the definition in the "destination to be jumped when select is pressed between entry #n and entry #n+1" field becomes for example invalid.

When for example "x" is defined in the "destination to be jumped when select is pressed between entry #n and entry #n+1" field or this field is blank, it is determined that there is no destination to be jumped. When necessary, the "destination to be jumped when select is pressed between entry #n and entry #n+1" fields can be extended.

FIGS. 24A and 24B show a definition format of the DEF2 that is included in "information of PBC". In the DEF2, information for creating the above-described selection list is defined.

The definition format of the DEF2 is the same as that of the DEF1 shown in FIGS. 23A and 23B except that "multi2" is defined in a "destination to be jumped when select is pressed".

In the DEF1, when the select key 106 or the #n key of the numeric key pad 105 is pressed, a jump to the list with the list name defined in the "destination to be jumped when select is pressed between entry #n and entry #n+1" field is performed. However, in the DEF2, when the #n key of the numeric key pad 105 is pressed, a jump to the list with the list name defined in the "destination to be jumped when select is pressed between entry #n and entry #n+1" field is not performed.

As shown in FIGS. 22A to 24B, since the definition formats of the RAND, the DEF1, and the DEF are the same (these formats are referred to as a common format), the RAND, the DEF1, and the DEF2 can be defined in one table (sheet). In other words, when information of the RAND is defined in the common format table, "random" is defined in the "destination to be jumped upon occurrence of time out" field. When information of the DEF1 or the DEF2 is defined in the common format table, "multi1" or "multi2" is defined in the "destination to be jumped when select is pressed" field, respectively.

The list name that is first referenced corresponding to the playback of the list with the list name defined in the "list name (destination to be jumped)" of the "information of PBC" should be for example "start". To finish the playback corresponding to the PBC, "end" is defined in the "destination to be jumped (any destination)". The definition "end" is equivalent to information for creating an end list of the PBC.

Since "random", "multi1", "multi2", and "x" are reserved words, they cannot be used as list names. The characters used for the definition of the "information of PBC" are the same as those of the "information of source".

The authoring system shown in FIG. 8 references the above-described "Ver" and performs a process corresponding thereto. Thus, the formats shown in FIGS. 10 and 11 are determined corresponding to "Ver".

Returning to FIG. 8, the authoring system for automatically producing a video CD (or data with a format for producing a video CD) corresponding to the COFF will be described.

Source data and "information of source" (information of encoding method) are input to the MPEG encoder portion 1. The MPEG encoder portion 1 encodes the source data into MPEG code corresponding to the "information of code", thereby generating an MPEG1 elementary stream. The MPEG1 elementary stream is supplied to the MPEG decoder portion 2. The MPEG decoder portion 2 decodes the MPEG1 elementary stream and outputs it.

The system operator references the decoded result that is output from the MPEG decoder portion 2. When for example the picture quality is abnormal, the operator corrects the "information of source" and then causes the MPEG encoder portion 1 to encode the source data (corresponding to MPEG). When the decoded result becomes normal, the operator causes the MPEG encoder portion 1 to generate the MPEG1 system stream.

The MPEG1 system stream is output to the video CD formatter portion 3, the simulation portion 4, and the CD-ROM formatter portion 5.

On the other hand, the scripts of the COFF ("information of source" (encoding method), "information of disc", and "information of PBC") are input to the video CD formatter portion 3. The video CD formatter 3 generates format information. The format information is composed of each file shown in FIG. 3, other files (that are placed in the PVD portion and that are transparent to the user as files), location information of each file (location information of each file shown in FIG. 2), and information necessary for system operation.

The video CD formatter portion 3 outputs the format information to the simulation portion 4. Alternatively, an memory image of the format information that is equivalent to the format information stored in a memory (not shown) that composes the video CD formatter portion 3 is output to the simulation portion 4. The simulation portion 4 simulates a playback of a video CD corresponding to the format information or the memory image thereof using the MPEG1 system stream that is input from the MPEG encoder portion 1.

The system operator references the simulation result of the simulation portion 4. When the playback of the video CD is abnormal (namely, the video CD cannot be correctly played back), the operator corrects the "information of PBC" and so forth and causes the video CD formatter portion 3 to generate format information once again. When the simulated result becomes normal, the operator causes the video CD formatter portion 3 to output the format information to the CD-ROM formatter portion 5.

The CD-ROM formatter portion 5 records the MPEG1 system stream that is input from the MPEG encoder portion 1 to a data writable CD (namely, CD-R (wRite-once) 6) corresponding to the format information that is input from the video CD formatter portion 3. Thus, the video CD is produced. Alternatively, data for producing a video CD is recorded on an MT 7 and then a video CD is produced corresponding to the data recorded on the MT 7.

Figure 25:
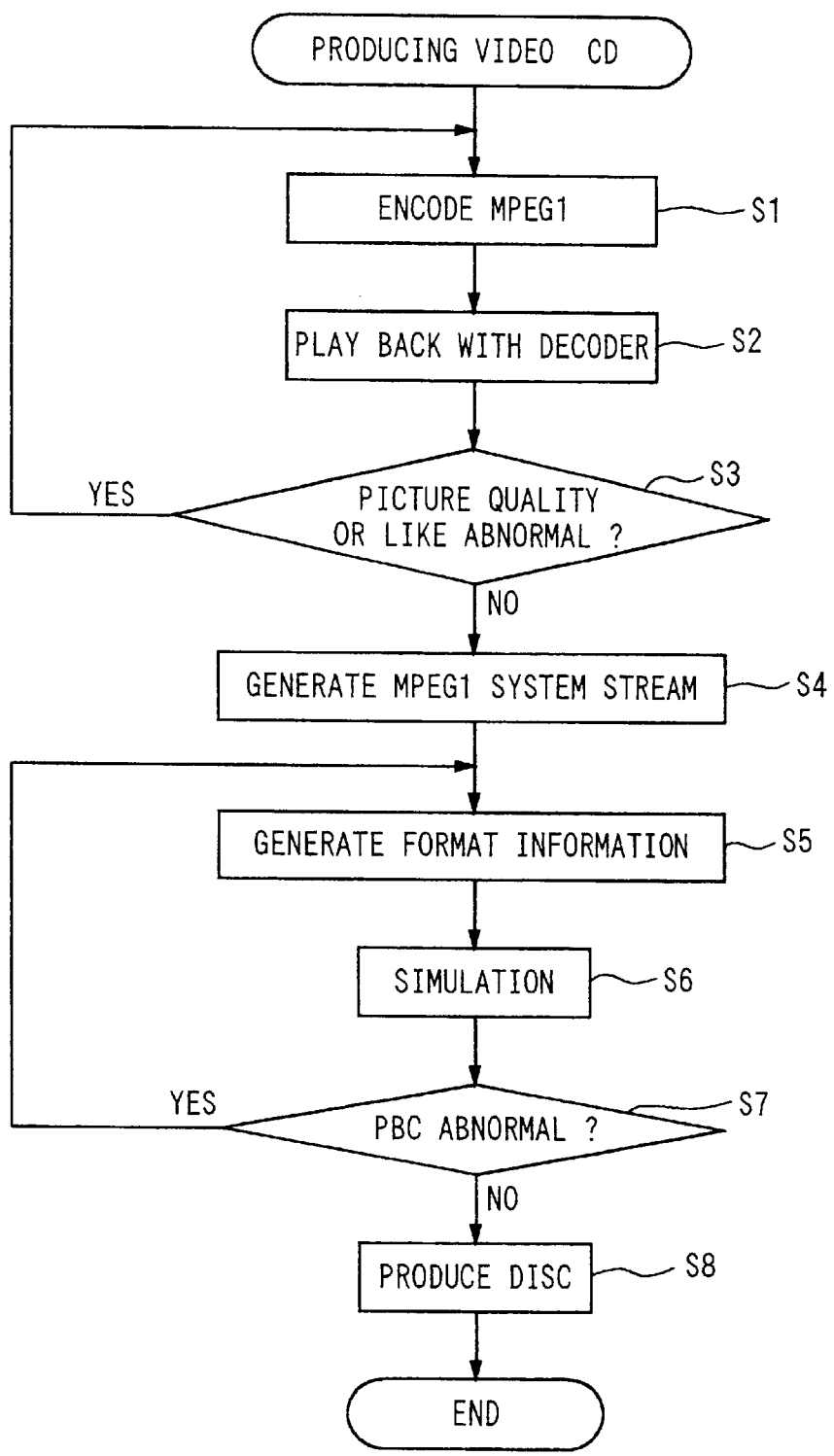
FIG. 25 is a flow chart for explaining the operation of the embodiment of FIG. 8.

FIG. 25 is a flow chart for explaining the operation of the authoring system shown in FIG. 8. At step S1, the MPEG encoder portion 1 encodes the source data corresponding to MPEG, thereby generating an MPEG1 elementary stream. Thereafter, the flow advances to step S2. At step S2, the MPEG decoder portion 2 (decoder) decodes the MPEG1 elementary stream into source data. Thereafter, the flow advances to step S3. At step S3, it is determined whether or not for example the picture quality of the source data played back at step S2 is normal.

When the determined result at step S3 is YES (namely, the picture quality of the source data played back is abnormal), the "information of source" is corrected. Thereafter, the flow returns to step S1. From step S1, the process is repeated. When the determined result at step S3 is NO (the picture quality is normal), the flow advances to step S4. At step S4, the MPEG encoder portion 1 generates the MPEG1 system stream.

Thereafter, the flow advances to step S5. At step S5, the video CD formatter portion 3 generates format information from the COFF scripts. At step S6, the simulation portion 4 simulates a playback of the video CD with the MPEG1 system stream generated at step S4 corresponding to the format information generated at step S5 or the memory image thereof.

After the simulation is finished, the flow advances to step S7. At step S7, it is determined whether or not for example the "information of PBC" is abnormal corresponding to the simulated result. When the determined result at step S7 is YES (namely, the "information of PBC" is abnormal, after the "information of PBC" is corrected, the flow returns to step S5. From step S5, the process is repeated. When the determined result at step S7 is NO (the "information of PCB" is normal), the flow advances to step S8. At step S8, the CD-ROM formatter portion 5 generates data for producing a video CD with the MPEG1 system stream generated at step S4 and the format information generated at step S5. The generated data is recorded on the CD-R 6 and thereby a video CD is produced. Alternatively, data for producing a video CD is recorded on the MT 7, recorded on the CD-R 6, and thereby a video CD is produced.

Next, with reference to FIGS. 26 to 30, each block that constructs the authoring system will be described.

Figure 26:
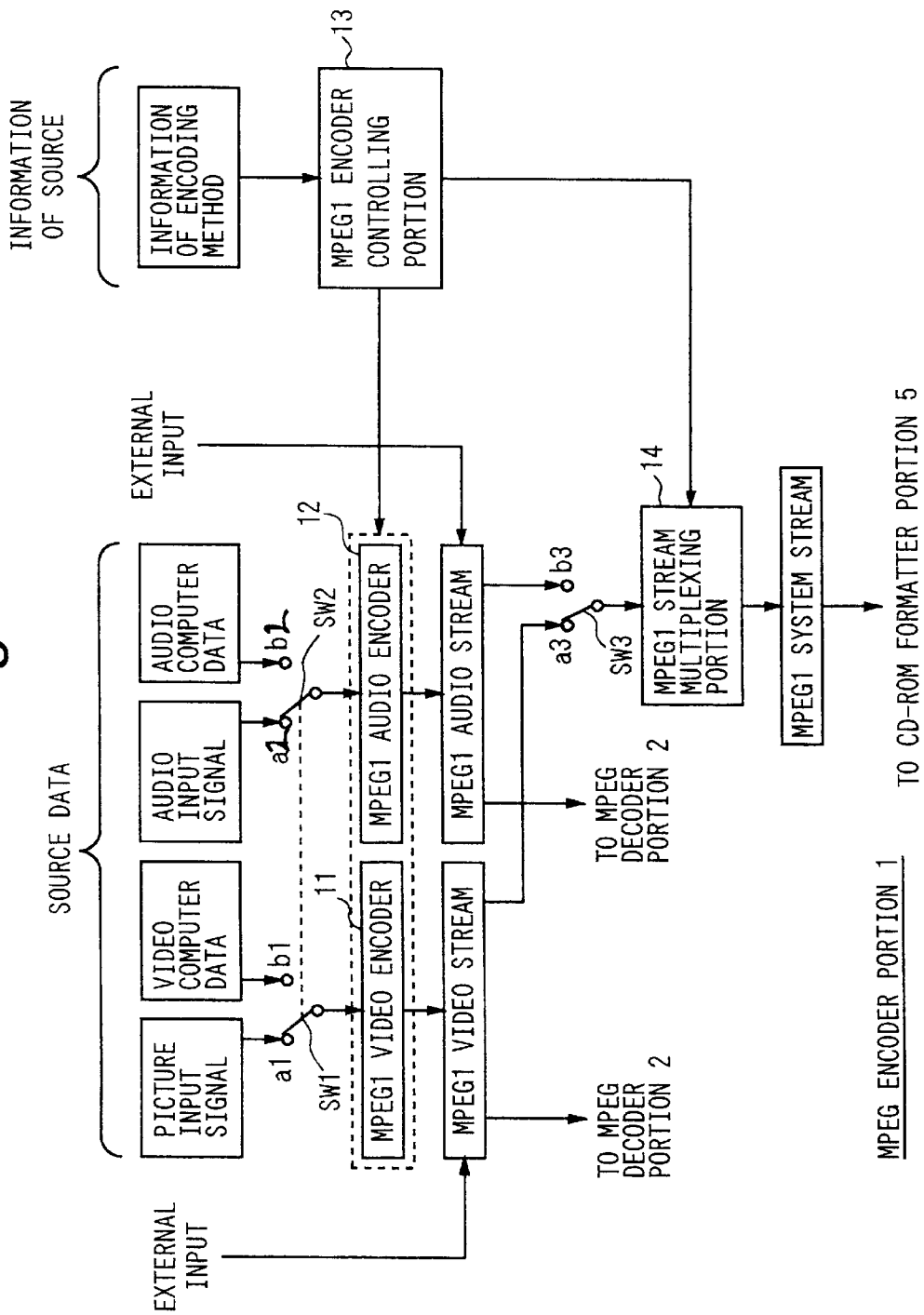
FIG. 26 is a block diagram showing a detailed construction of an MPEG encoder portion 1 of FIG. 8.

FIG. 26 is a block diagram showing a detailed construction of the MPEG encoder portion 1 (see FIG. 8). The "information of source" is input to the MPEG1 encoder controlling portion 13. The MPEG1 encoder controlling portion 13 control a playback unit (not shown) that plays back a record medium on which source data (that has not been encoded corresponding to MPEG) corresponding to the "information of source is recorded". Thus, the playback unit plays back the source data in an area with a start point and an end point designated with time codes defined in the "start" field and the "end" field shown in FIG. 13. The resultant data is supplied to the MPEG encoder portion 1. Alternatively, source data recorded with the file name defined in the "file name" field shown in FIG. 14 is sent to the MPEG encoder portion 1.

Video data and audio data of the source data are supplied to the MPEG1 video encoder 11 and the MPEG1 audio encoder 12 through switches SW1 and SW2, respectively.

Video data of the source data processed by a computer (hereinafter this video data is referred to as video computer data) is supplied to a terminal b1. Video data that is not video computer data (hereinafter this video data is referred to as picture input data) is supplied to a terminal a1. Audio data of the source data that is processed by the computer (hereinafter this audio data is referred to as audio computer data) is supplied to a terminal b2. Audio data that is not audio computer data (hereinafter this audio data is referred to as audio input data) is supplied to a terminal a2.

The switch SW1 is placed in the terminal a1 position or the terminal b1 position corresponding to the type of source data supplied from the playback unit (namely, whether or not the source data is video computer data or not). This also applies to the switch SW2.

The switches SW1 and SW2 operate in association. In other words, when the switch SW1 is placed in the terminal a1 position or b1 position, the switch SW2 is placed in the terminal a2 position or b2 position, respectively. This is because a picture input signal is accompanied with an audio input signal and video computer data is accompanied with audio computer data.

The MPEG1 video encoder 11 and the MPEG1 audio encoder 12 are controlled by the MPEG1 encoder controlling portion 13 corresponding to "information of source" so that the video data (picture input signal or video computer data) and the audio data (audio input signal or audio computer data) are encoded corresponding to MPEG, respectively. In other words, the MPEG1 audio encoder 12 encodes the audio data at the audio rate or in the mode defined in the "audio rate" field or the "audio mode" field shown in FIGS. 13 and 15.

The MPEG1 video stream and the MPEG1 audio stream as the encoded results of the MPEG1 video encoder 11 and the MPEG1 audio encoder 12 are output as the MPEG1 elementary stream to the MPEG decoder portion 2 (see FIG. 8).

As described above, the MPEG decoder portion 2 decodes the MPEG1 elementary stream. When the decoded result is normal, the MPEG1 elementary stream (MPEG1 video stream and MPEG1 audio stream) is output to an MPEG1 stream multiplexing portion 14 through a switch SW3.

The MPEG1 video stream and the MPEG1 audio stream are supplied to terminals a3 and b3, respectively. The switch SW is alternately placed in the terminals a3 and b3 at predetermined timings. Thus, the MPEG1 video stream and the MPEG1 audio stream are alternately supplied to the MPEG1 stream multiplexing portion 14 at the predetermined timings.

The MPEG1 stream multiplexing portion 14 multiplexes the MPEG1 video stream and the MPEG1 audio stream along with synchronous information and so forth and generates an MPEG1 system stream. The MPEG1 system stream is supplied to the video formatter portion 3, the simulation portion 4, and the CD-ROM formatter portion 5 shown in FIG. 5. The MPEG1 stream multiplexing portion 14 converts the generated MPEG1 system stream into the format of a CD-DOM mode 2/form 2 that is data of a CD-ROM sector image. The data of the CD-ROM sector image is supplied to a later block of the MPEG1 encoder portion 1. However, in this specification and the accompanied drawings, for simplicity, the CD-ROM sector image data is treated as the MPEG1 system stream.

The MPEG1 encoder controlling portion 13 controls the MPEG1 stream multiplexing portion 14 with reference to the ENTRY of the "information of source" so as to place a sequence header to an entry position of the MPEG1 system stream. The MPEG1 encoder controlling portion 13 controls the MPEG1 stream multiplexing portion 14 with reference to the APAUSE of the "information of source" so as to turn on a trigger bit (in a sub header of mode 2/form 1 and mode 2/form 2 of the CD-ROM standard) corresponding to a pause position of the MPEG1 system stream. In the standard of the video CD version 2.0, when the trigger bit is turned on, a pause is placed. (In the standard of the video CD version 1.1 and so forth, the use of the trigger bit has not been defined.)

When a still picture that composes a slide is played back, after a particular still picture is displayed, until the next still picture is displayed (this period is referred to as preparation time period), the next still picture should have been decoded. Thus, the MPEG encoded result should have code amount that can be decoded in the preparation time period (this data amount is referred to as proper encoding amount).

The MPEG1 encoder 13 calculates the preparation time period with reference to the "time code" field of the SLIDE (see FIG. 16) of the "information of source" and obtains the proper coding amount corresponding to the preparation time period. The MPEG1 encoder controlling portion 13 controls a compression encoding ratio of the MPEG1 video encoder 11 so that the MPEG encoded result of the still picture is equal to or less than the proper encoding amount.

The MPEG encoder portion 1 has a video external input terminal and an audio external input terminal. The MPEG encoded video data (MPEG1 video stream) and the MPEG encoded audio data (MPEG1 audio stream) are input to the video external input terminal and the audio external input terminal, respectively. The video external input terminal and the audio external terminal are connected to the terminals a3 and b3, respectively. Thus, the MPEG encoded video data and the MPEG encoded audio data are input as the MPEG1 system stream to the MPEG1 stream multiplexing portion 14.

In other words, in the authoring system, the MPEG encoded video data and the MPEG encoded audio data can be reused.

In addition, the MPEG encoder portion 1 encodes particular source data corresponding to MPEG and designates predetermined file names to the MPEG1 elementary stream and the MPEG1 system stream (there files are referred to as internal file names). The MPEG decoder portion 2, the video CD formatter portion 3, the simulation portion 4, and the CD-ROM formatter portion 5 identify the MPEG1 elementary stream and the MPEG1 system stream with the internal file names.

Figure 27:
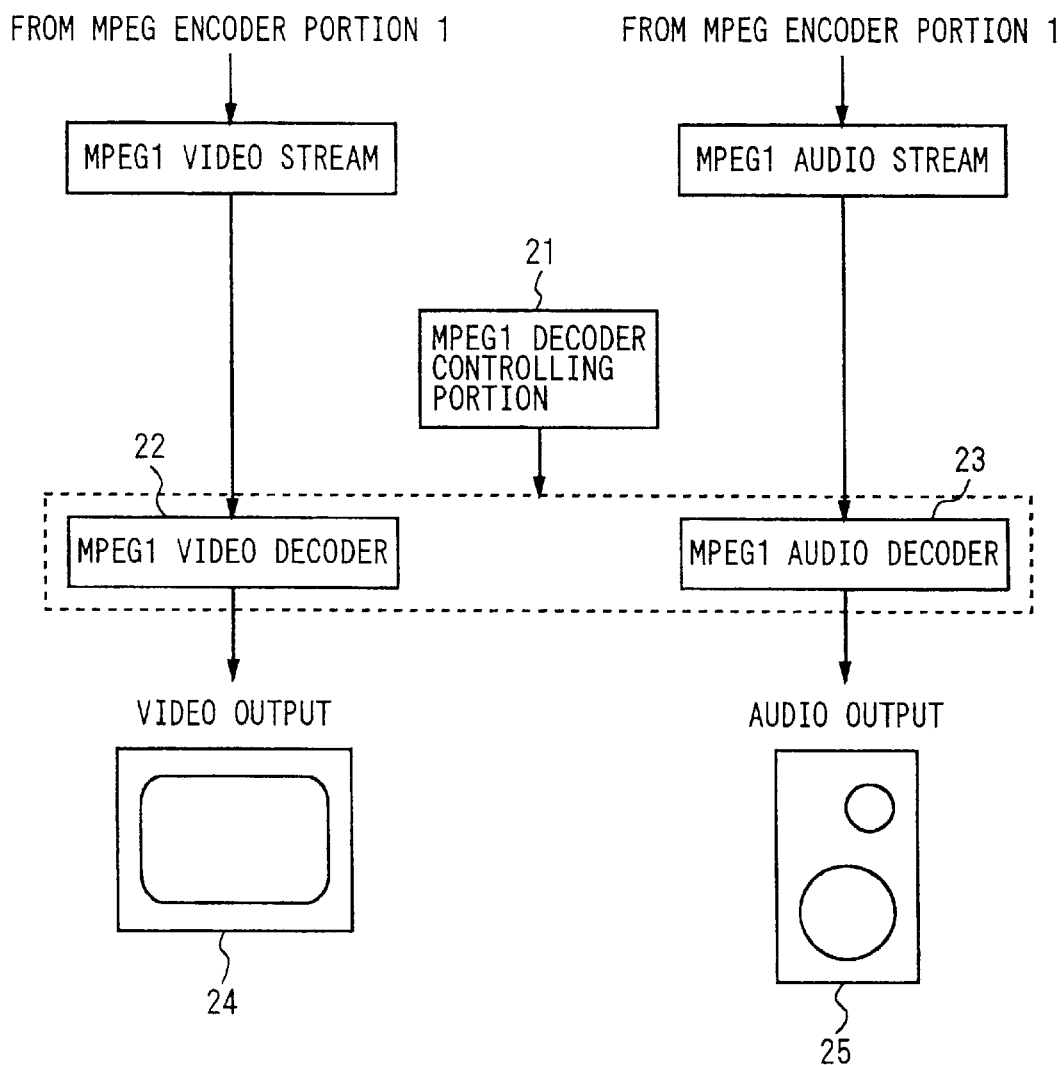
FIG. 27 is a block diagram showing a detailed construction of an MPEG encoder portion 2 of FIG. 8.

FIG. 27 shows a detailed construction of the MPEG decoder portion 2 (see FIG. 8). The MPEG1 video stream and the MPEG1 audio stream that are the MPEG1 elementary stream are output from the MPEG encoder portion 1 to the MPEG1 video decoder 22 and the MPEG1 audio decoder 23 that are controlled by the MPEG1 decoder controlling portion 21, respectively.

The MPEG1 video decoder 22 and the MPEG1 audio decoder 23 decode the MPEG1 video stream and the MPEG1 audio stream and output them to a monitor 24 and a speaker 25, respectively. The monitor 24 displays the decoded source data (pictures). The speaker 25 outputs the decoded source data (audio).

The system operator determines whether or not outputs of the monitor 24 and the speaker 25 are normal.

Figure 28:
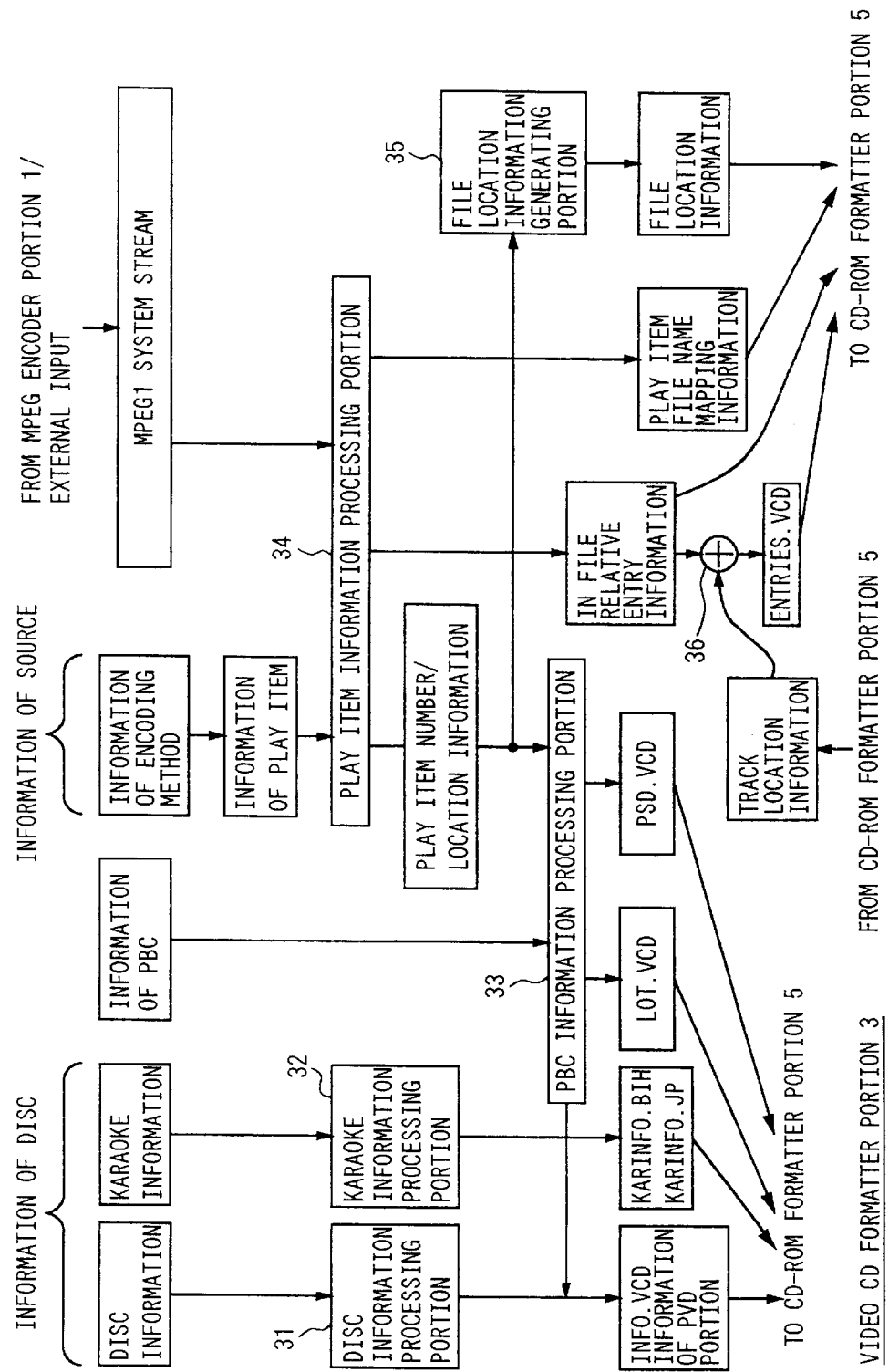
FIG. 28 is a block diagram showing a detailed construction of a video CD formatter portion 3 of FIG. 8.

FIG. 28 shows a detailed construction of the video CD formatter portion 3 (see FIG. 8). The video formatter portion 3 inputs the "information of disc", the "information of PBC", the "information of source" (in particular, play item information), and the MPEG1 system stream. The MPEG1 system stream is supplied from the MPEG encoder portion 1 (see FIG. 8). Alternatively, the MPEG1 system stream that has been encoded corresponding to MPEG and that has been recorded in a file with the file name defined in the "file name" field of the ENCODED shown in FIG. 17 is supplied from the external input terminal.

The MPEG1 system stream that has been encoded corresponding to MPEG is supplied to the simulation portion 4 and the CD-ROM formatter portion 5 as well as the video CD formatter portion 3. Thus, according to the authoring system, the MPEG1 system stream that has been encoded corresponding to MPEG can be reused.

The disc information (DISCINFO (see FIG. 9)) and the KARAOKE information (KAR (see FIG. 10)) of the "information of disc" are input to a disc information processing portion 31 and a KARAOKE information processing portion 32, respectively. The disc information processing portion 31 generates the file INFO.VCD shown in FIG. 3 from the disc information. The KARAOKE information processing portion 33 generates the files KARINFO.BIH and KARIN-FO.JP shown in FIG. 3 from the KARAOKE information.

In addition, the disc information processing portion 31 generates information to be placed in the PVD portion (see FIG. 2) of the video CD from the disc information. This information is transparent to the user of the video CD.

Now assume that the file INFO.VCD includes information to be placed in the PVD portion. In reality, the information placed in the PVD portion is treated as one file along with file name mapping information and file location information of a play item (that will be described later). The file is output to the CD-ROM formatter portion 5.

The "information of PBC" is input to a PBC information processing portion 33. The PBC information processing portion 33 generates the file LOT.VCD shown in FIG. 3 from the "information of PBC". A play item information processing portion 34 supplies play item number and location information (that will be described later) to the PBC information processing portion 33. The PBC information processing portion 33 generates the file PSD.VCD shown in FIG. 3 from the play item number and location information and the "information of PBC". The PBC information processing portion 33 generates information (such as the size of the file PSD.VCD) to be recorded in the file INFO.VCD. This information is included in the file INFO.VCD that is output from the disc information processing portion 31.

The play item information of the "information of source" is input to the play item information processing portion 34.

The play item information includes the definition items of the "source name" field, the "location" field, and the "audio mode" field of the MOVIE (see FIG. 13), the definition items of the "source name" field, the "file name" field, and the "resolution" field of the STILL (see FIG. 14), the definition items of the "source name" field and the "audio mode" field of the AUDIO (see FIG. 15), the definition item of the "slide source name" field of the SLIDE (see FIG. 16), the definition items of the all fields of the ENTRY (see FIG. 18), and the definition items of the "source name" field and the "time code" field of the APAUSE (see FIG. 19). However, when the time code defined in the "time code" field is not a time code of which the display start time of the source data is 00:00:00:00 (this time code is hereinafter referred to as an ABS time code), the time code is converted into the ABS time code by the play item information processing portion 34.

The MPEG1 system stream is input to the play item information processing portion 34 along with the play item information. The play item information processing portion 34 generates play item number and location information with reference to the play item information and the MPEG1 system stream.

The play item number and location information includes an item number (a value of which a predetermined offset is added to the segment play item PIM#n and track Tr#n shown in FIG. 2) of a play item (source data) placed on a video CD and a location on the video CD.

The play item information processing portion 34 references the definition items of the ENTRY (see FIG. 18) included in the play item information. When an entry is placed in source data placed in the SPIM portion (see FIG. 2), the play item information processing portion 34 generates in-file relative entry information.

The in-file relative entry information is a so-called relative position of an entry placed in particular source data (namely, a file of PIM (segment play item) (see FIG. 2)) placed in the SPIM portion (see FIG. 2) from the beginning.

An absolute position (for example, a sector address) of an entry on a video CD is recorded in the file ENTRIES.VCD shown in FIG. 3. The absolute position is generated corresponding to the in-file relative entry information as will be described later.

The play item information processing portion 34 generates play item file name mapping information from the play item information and the MPEG1 system stream.

The play item file name mapping information is a file name of mapping information of a file of a play item (source data) placed on a video CD. The file name is for example the source name defined in the "source name" field of the MOVIE (see FIG. 13), the STILL (see FIG. 14), or the AUDIO (see FIG. 15), the source name defined in the "slide source name" field of the SLIDE (see FIG. 16), or the above-described inner file name.

As described above, in a video CD, the file name should be changed corresponding to for example the file location. Thus, when a video CD is authored, if a file name corresponding to the standard of the video CD is used and the file location is changed, it is difficult to know the source data of the file. In addition, it is also difficult to place the source data in different locations for a plurality of video CDs.

In the authoring system shown in FIG. 8, source data (play item) is treated with a file name that is the source name defined in the "source name" field of the MOVIE (see FIG. 13), the STILL (see FIG. 14), or the AUDIO (see FIG. 15), a source name defined in the "slide source name" field of the SLIDE (see FIG. 16), or the like as file name mapping information so as to solve such a problem.

The play item number and location information generated by the play item information processing portion 34 is supplied to a file location information generating portion 35. The file location information generating portion 35 generates file location information with reference to the play item number and location information.

For a file placed on the track Tr1, the file location information is represented as sectors of the location of the file. For a file placed on the track Tr2 or later, the file location information is a track number of which the file is placed.

The files INFO.VCD, KARINFO, BIH, KARINFO.JP, LOT.VCD, PSD.VCD, in-file relative entry information, file name mapping information of a play item, and file location information are output to the CD-ROM formatter portion 5.

Figure 29:
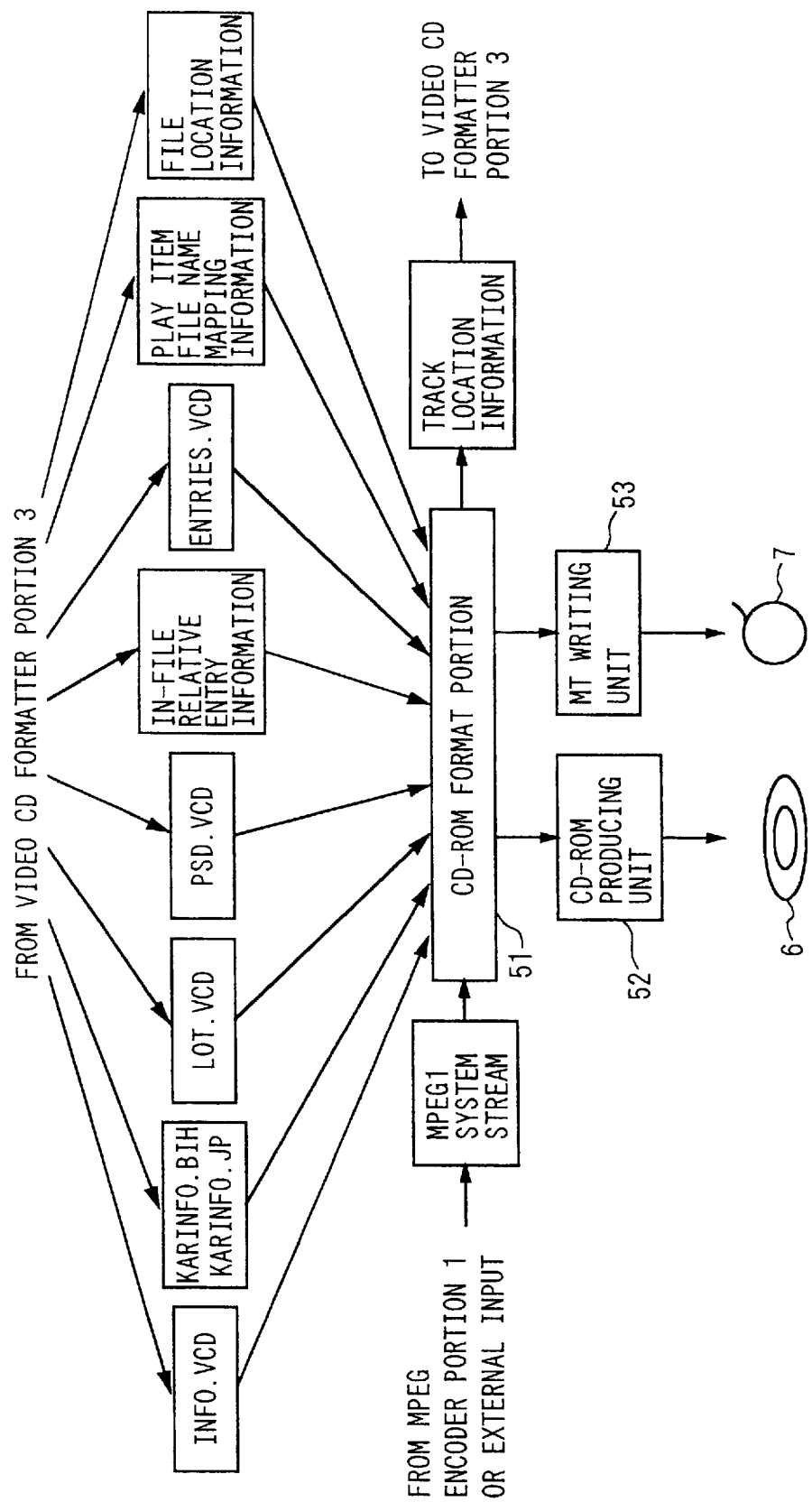
FIG. 29 is a block diagram showing a detailed construction of a CD-ROM formatter portion 5 of FIG. 8.

FIG. 29 is a block diagram showing a detailed construction of the CD-ROM formatter portion 5. The files INFO.VCD, KARINFO.BIH, KARINFO.JP, LOT.VCD, PSD.VCD, in-file relative entry information, play item file name mapping information, and file location information are supplied from the video CD formatter portion 3 to the CD-ROM format portion 51. The CD-ROM format portion 51 determines the location of a track formed on the video CD corresponding to the files INFO.VCD, KARINFO.BIH, KARINFO.JP, LOT.VCD, PSD.VCD, in-file relative entry information, play item file name mapping information, and file location information and obtains the track location information that is information at the beginning (for example, a sector address on the video CD).

The track location information is supplied to an arithmetic unit 36 of the video CD formatter portion 3 (see FIG. 28). The in-file relative entry information generated by the play item information processing portion 34 is supplied to the arithmetic unit 36 along with the track location information. The arithmetic unit 36 adds the track location information and the in-file relative entry information (namely, adds the position of an entry from the beginning of the file, equivalent to the beginning of the track, and the position at the beginning of the track that is a segment) so as to obtain the absolute position of the entry on the video CD. The file ENTRIES.VCD shown in FIG. 3 is generated corresponding to the absolute position.

The file ENTRIES.VCD is supplied to a CD-ROM format portion 51 of the CD-ROM formatter portion 5 (see FIG. 29).

The files INFO.VCD, KARINFO.BIH, KARINFO.JP, LOT.VCD, PSD.VCD, ENTRIES.VCD, play item file name mapping information, and file location information are equivalent to the format information shown in FIG. 8.

A memory image of a memory of each block that composes the video CD formatter portion 3 is equivalent to the files INFO.VCD, KARINFO.BIH, KARINFO.JP, LOT.VCD, PSD.VCD, in-file relative entry information, play item file name mapping information, and file location information. This memory image is equivalent to the memory image of the format information shown in FIG. 8.

The MPEG1 system stream is supplied from the MPEG encoder portion 1 (see FIG. 8) to the CD-ROM format portion 51 along with the format information. Alternatively, the MPEG1 system stream that has been encoded corresponding to MPEG is supplied from the outside to the CD-ROM format portion 51. The CD-ROM format portion 51 is a general-purpose unit that formats a CD-ROM. The CD-ROM format portion 51 converts the files INFO.VCD, KARINFO.BIH, KARINFO.JP, LOT.VCD, PSD.VCD, and ENTRIES.VCD and the MPEG1 system stream into a record format of a video CD corresponding to the play item file name mapping information and the file location information of the format information (in this converting process, the file name of each file is converted into the file name shown in FIG. 3) so as to generate image data of the video CD.

The image data of the video CD is output to a CD-ROM producing unit 52. The CD-ROM producing unit 52 records the image data of the video CD on a CD-R 6. Thus, a video CD is produced. Alternatively, the image data of the video CD is output to an MT writing unit 53 and recorded on the MT 7. Thereafter, corresponding to the data recorded on the MT 7, a video CD is produced.

When scripts of the COFF shown in FIGS. 9, 10, and 13 to 24 are used, a video CD with data placed as shown in FIG. 2 is produced. When the video CD is played back with the PBC, pictures and audio are played back in the interactive manner as shown in FIGS. 5 to 7.

Figure 30:
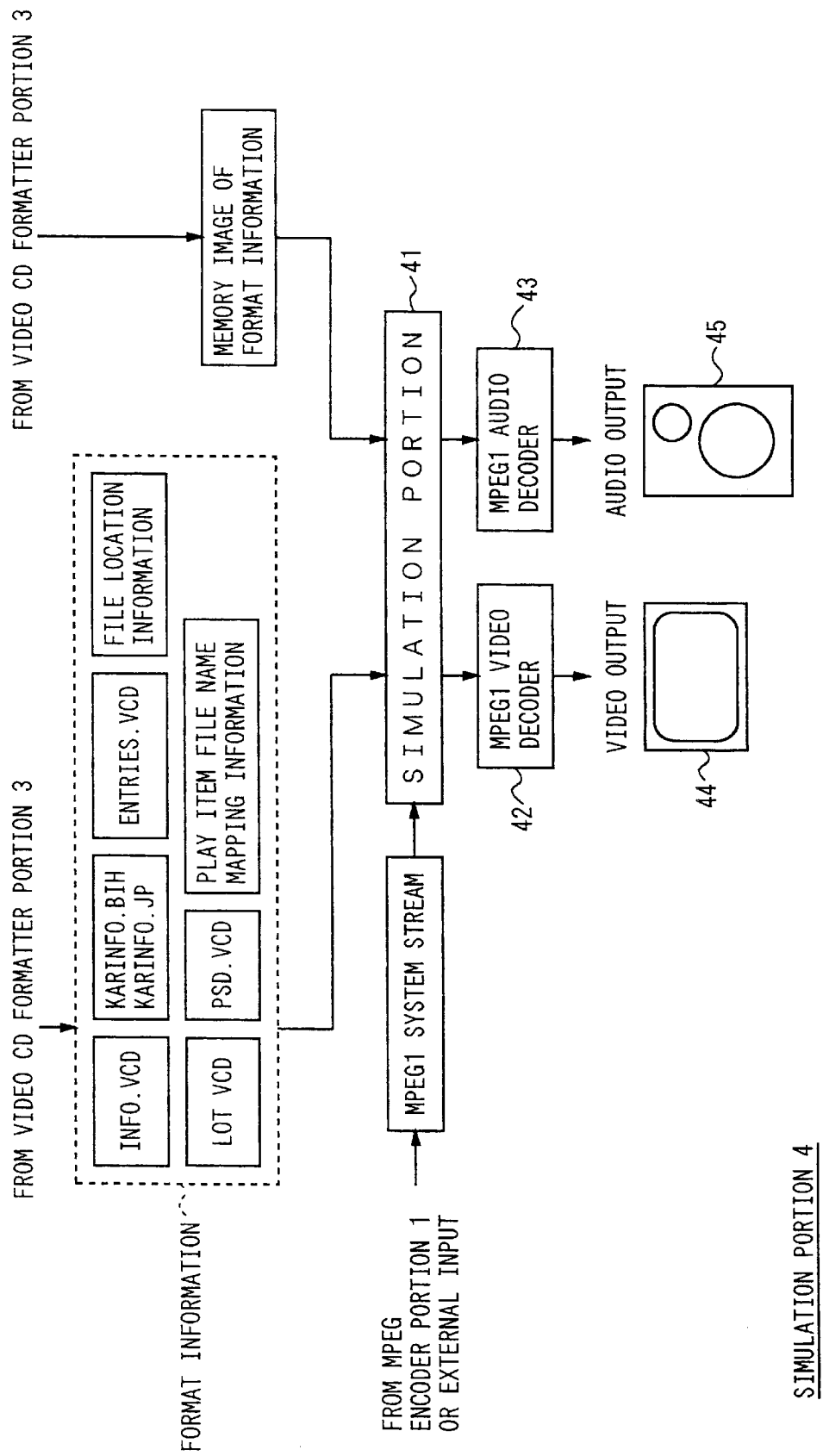
FIG. 30 is a block diagram showing a detailed construction of a simulation portion 4 of FIG. 8.

FIG. 30 is a block diagram showing a detailed construction of the simulation portion 4 (see FIG. 8). When the simulation portion 4 is composed of one independent block by for example software, the format information supplied from the video CD formatter portion 3 to the CD-ROM formatter portion 5 is supplied to the simulation portion 4. In addition, the simulation portion 4 is composed of one software program along with for example the video CD formatter portion 3. In this case, the simulation portion 4 shares the process of the memory image of the format information on the memory of the video CD formatter portion 3 with the video CD formatter portion 3. When the memory image of the format information is shared, the process can be performed at high speed.

The format information (or the memory image in the case that the memory image of the format information is shared by the video CD formatter portion 3 and the simulation portion 4) is input to a simulation portion 41. in addition to the format information, the MPEG1 system stream is supplied from the MPEG encoder portion 1 (see FIG. 8) to the simulation portion 41. Alternatively, the MPEG1 system stream that has been encoded corresponding to MPEG is supplied to the simulation portion 41 from the outside.

The simulation portion 41 simulates a playback of the video CD. In other words, the simulation portion 41 supplies the MPEG1 system stream to the MPEG1 video decoder 42 and the MPEG1 audio decoder 43 corresponding to the PBC (playback control) recorded in the file PSD.VCD of the format information so as to decode it. In other words, the simulation portion 41 discomposes the MPEG1 system stream into an MPEG1 video stream and an MPEG1 audio stream as the MPEG1 elementary stream and supplies them to an MPEG1 video decoder 42 and an MPEG1 audio decoder 43, respectively. The MPEG1 video decoder 42 and the MPEG1 audio decoder 43 decode the MPEG1 elementary stream under the control of the simulation portion 41 and output video data and audio data as the respective decoded results to a monitor 44 and a speaker 45, respectively. The monitor 44 displays the video data as pictures. The speaker 45 outputs the audio data as audio.

The system operator determines whether or not the outputs of the monitor 44 and the speaker 45 are normal.

In the authoring system, the "information of source" and the "information of disc" are input in tabular formats. Thus, since it is not necessary to input such information from such as a keyboard, input errors thereof can be prevented.

In the authoring system, source data is encoded corresponding to the "information of source". The encoded data, the "information of disc", and the "information of PBC" are converted into the record format of the video CD corresponding to the "information of source". Thus, the video CD can be simply and easily authored.

In addition, in the authoring system, since the MPEG1 elementary stream is decoded, it can be determined whether or not the encoded source data is normal.

In the authoring system, since a playback of the video CD is simulated, before the video CD is produced, the playback condition can be determined.

Since source data is defined with source names in the "information of source" and the "information of PBC", the system operator can easily know what files contain what source data. Thus, incorrect operations can be prevented. In addition, when a plurality of video CDs are authored with the same source data, the source data can be easily placed in different locations of the video CDs.

The MPEG encoder portion 1 MPEG encodes the source data corresponding to the "information of source" defined in the tabular format. Thus, information equivalent to the "information of source" can be easily encoded without need to input it through for example a keyboard.

In this embodiment, the encoding is performed corresponding to MPEG1. However, it should be noted that the encoding can be performed corresponding to for example MPEG2.

In addition, the authoring system can be constructed without the MPEG decoder portion 2 and the simulation portion 4. Moreover, when source data that has been encoded corresponding to MPEG is used, the authoring system can be constructed without the MPEG encoder portion 1. In this case, the size and cost of the system can be reduced.

In this embodiment, video CDs of Ver. 1.0, Ver. 1.1, and Ver. 2.0 are authored. However, when video CDs of higher versions that require more than the current versions become available in future, the present invention can be applied for systems that author video CDs of the higher versions. In the present invention, video CDs are used as record mediums. However, the present invention can be applied for other record mediums such as other optical discs and magnetic tapes.

As described above, according to the data input method of the present invention, since process information and digital video disc information are input in the tabular formats, input errors can be prevented.

According to the encoding apparatus of the present invention, the encoding means is controlled corresponding to process information defined in the tabular formats. Thus, source data can be easily encoded.

According to the data processing apparatus of the present invention, a converting process to the record format of a digital video disc is performed corresponding to process information and digital video disc information defined in the tabular formats. Thus, a digital video disc can be easily produced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data processing method for converting data to be recorded on a digital video disc into a record format thereof, comprising the steps of:
  (a) gene rating source data including at least a picture signal;
  (b) encoding the source data into encoded data using an encoding method;
  (c) generating a script, said script including at least information regarding s aid encoded data content, and information identifying said encoding method in a tabular format;
  (d) generating format information of the disc corresponding to at least the script and the encoded data; and
  (e) generating record format data composed of the encoded data corresponding to the format information.

2. The data processing method as set forth in claim 1, where in the script defines names of the source data in a vertical direction and features thereof in a horizontal direction.

3. The data processing method as set forth in claim 1, wherein the script includes playback control information for the encoded data when said disc is intended for interactive playback.

4. The data processing method as set forth in claim 3, wherein the script includes a list of names of data segments in said encoded data in a vertical direction and information of playback control for said data segments in a horizontal direction.

5. The data processing method as set forth in claim 4, wherein the script includes at least information indicating a next operation as the information of playback control.

6. A system for producing video compact discs comprising:
  signal encoder means;
  a first signal containing source data input to said encoder means;
  a second signal, separate from said first signal, containing data identifying an encoding method used by said encoder means and describing program content corresponding segments of said source data;
  means for generating disc format information;
  an encoded data stream output by said encoder means and input to said means for generating disc format information, wherein said second signal is also input to said means for generating disc format information;
  a third signal containing disc format information output by said means for generating disc format information; and
  means for formatting and writing a video compact disc;
  wherein said third signal containing disc format information and said encoded data stream are input to said means for formatting and writing to produce a video compact disc.

7. A system as set forth in claim 6, wherein said first signal containing source data includes:
  data instructing said encoder means as to a method of encoding to be used; and
  at least one of a picture input signal, an audio input signal, computer video data, and computer audio data.

8. A system as set forth in claim 6, wherein said video compact disc will be interactive and said second signal further comprises playback control information governing said interactivity.

9. A system as set forth in claim 7, further comprising:
  an encoded elementary data stream which is output by said encoder means;
  decoder means for decoding said elementary data stream; and
  means for adjusting the information of encoding method contained in said signal containing source data in response to said decoding of said elementary data stream.

10. A system as set forth in claim 6, further comprising:
  simulation means which receive said encoded data stream and said third signal containing disc format information, wherein said simulation portion simulates the output of a video disc on which said encoded data stream is recorded according to said disc format information; and means for adjusting said third signal containing disc format information in response to said simulation means.

11. A system as set forth in claim 6, wherein said means for formatting and writing further comprise:
   means for recording on a magnetic tape; and
   means for producing a video compact disc from the recording on said magnetic tape.

12. A system as set forth in claim 7, wherein said encoder means further comprise:
   video encoder means;
   audio encoder means; and
   means for controlling said video and audio encoder means in response to said information of encoding method.

13. A system as set forth in claim 12, wherein said encoder means further comprise:
   a first switch which controls whether said video encoder means receive said picture input signal or said computer video data;
   a second switch which controls whether said audio encoder means receive said audio input signal or said computer audio data; and
   multiplexing means for multiplexing output from said video encoder means and said audio encoder means;
   wherein when said first switch and said second switch either direct said video input signal and said audio input signal to said video encoder means and said audio encoder means, respectively, or said video computer data and said audio computer data to said video encoder means and said audio encoder means, respectively.

14. A system as set forth in claim 9, wherein said decoder means further comprises:
   video decoder means;
   audio decoder means;
   video output means connected to said video decoder means; and
   audio output means connected to said audio decoder means.

15. A system as set forth in claim 10, wherein said simulation means further comprise:
   video decoder means;
   video output means connected to said video decoder means;
   audio decoder means; and
   audio output means connected to said audio decoder means.

16. A method for producing video compact discs comprising:
   encoding a first signal containing source data according to encoding instructions contained in said first signal;
   outputting an encoded data stream;
   generating disc format information using said encoded data stream and a second signal containing said encoding instructions and data describing program content corresponding to segments of said source data;
   outputting a third signal containing said disc format information;
   formatting and writing a video compact disc using said third signal containing disc format information and said encoded data stream.

17. A method as set forth in claim 16, wherein said first signal containing source data includes at least one of a picture input signal, an audio input signal, computer video data, and computer audio data.

18. A method as set forth in claim 16, wherein said video compact disc will be interactive and said second signal further comprises playback control information governing said interactivity.

19. A method as set forth in claim 17, further comprising the steps of:
   outputting an encoded elementary data stream;
   decoding said encoded elementary data stream; and
   adjusting the information of encoding method contained in said signal containing source data in response to said decoding of said elementary data stream.

20. A method as set forth in claim 16, further comprising:
   simulating the output of a video disc on which said encoded data stream is recorded, said simulating being performed according to said disc format information; and
   adjusting said third signal containing disc format information in response to said simulation.

21. A method as set forth in claim 16, wherein said step of formatting and writing further comprises:
   recording on a magnetic tape; and
   producing a video compact disc from the recording on said magnetic tape.

22. A method as set forth in claim 17, wherein said step of encoding further comprises:
   encoding a video portion of said source data;
   encoding an audio portion of said source data; and
   controlling said video portion encoding and audio portion encoding in response to said information of encoding method.

23. A method as set forth in claim 22, wherein said step of encoding further comprises:
   switching between an input for said picture input signal and an input for said computer video data for encoding said video portion of said source data;
   switching between an input for said audio input signal and an input for said computer audio data for encoding said audio portion of said source data; and
   multiplexing said encoded video portion and said encoded audio portion to output said encoded data stream;
   wherein said switching results in encoding of said video input signal and said audio input signal, or said video computer data and said audio computer data.

24. A method as set forth in claim 15, wherein said step of decoding further comprises:
   decoding a video portion of said encoded elementary data stream;
   outputting said decoded video portion of said encoded elementary data stream;
   decoding an audio portion of said encoded elementary data stream; and
   outputting said decoded audio portion of said encoded elementary data stream.

25. A method as set forth in claim 20, wherein said step of simulating further comprise:
   decoding a video portion of said encoded data stream;
   outputting said decoded video portion of said encoded data stream;
   decoding an audio portion of said encoded data stream; and
   outputting said decoded audio portion of said encoded data stream.

* * * * *

UNITED STATES PATENT AND TRADEMARK OFFICE
CERTIFICATE OF CORRECTION

PATENT NO. : 6,438,315 B1  Page 1 of 1
DATED : August 20, 2002
INVENTOR(S) : Kazuhiro Suzuki et al.

It is certified that error appears in the above-identified patent and that said Letters Patent is hereby corrected as shown below:

Title page,
Item [57], ABSTRACT,
Line 8, replace "at last" with -- at least --.

Column 29,
Line 55, replace "gene rating" with -- generating --.
Line 60, replace "regarding s aid" with -- regarding said --.

Signed and Sealed this

Fourteenth Day of October, 2003

JAMES E. ROGAN
*Director of the United States Patent and Trademark Office*